United States Patent [19] [11] 4,100,598
Stiel et al. [45] Jul. 11, 1978

[54] TABLET PRESS RELATED INSTRUMENTATION FOR USE IN DEVELOPMENT AND CONTROL OF FORMULATIONS OF PHARMACEUTICAL GRANULATIONS

[75] Inventors: Donald Melvyn Stiel, Pinebrook; Charles Robert Browski, Jersey City; Eric Neugroschel, Metuchen; Joseph James Williams, West Caldwell, all of N.J.

[73] Assignee: Hoffmann-La Roche Inc., Nutley, N.J.

[21] Appl. No.: 714,141

[22] Filed: Aug. 13, 1976

Related U.S. Application Data

[62] Division of Ser. No. 610,706, Sep. 5, 1975, abandoned.

[51] Int. Cl.[2] .......................... G06F 15/00; B28B 3/00; B29C 3/06

[52] U.S. Cl. ................................ 364/476; 73/88.5 R; 209/79; 264/109; 425/149; 425/352

[58] Field of Search .................... 235/151.3; 264/40.5, 264/40.6, 109; 209/79; 425/147, 149, 256, 352, 170; 73/88.5 R, 67.1; 364/476

[56] References Cited

U.S. PATENT DOCUMENTS

| | | | |
|---|---|---|---|
| 2,735,380 | 2/1956 | Bowes | 425/352 |
| 3,255,716 | 6/1966 | Knoechel et al. | 264/40.5 |
| 3,337,915 | 8/1967 | Alexander, Jr. | 425/352 |
| 3,507,388 | 4/1970 | Furtwaengler et al. | 209/79 |
| 3,704,976 | 12/1972 | Petersen | 425/352 |
| 3,734,663 | 5/1973 | Holm | 425/352 |
| 3,891,930 | 6/1975 | Petrusson | 328/117 |
| 3,920,367 | 11/1975 | Ma et al. | 364/476 |
| 3,933,032 | 1/1976 | Tschoegl | 73/67.1 |

FOREIGN PATENT DOCUMENTS

| | | |
|---|---|---|
| 1,040,274 | 8/1966 | United Kingdom. |
| 1,216,397 | 12/1970 | United Kingdom. |

OTHER PUBLICATIONS

Edw. Mandell Co. (Yonkers, N.Y.) Technical Service Bulletin, "Advanced Techniques in the Art of Direct Compression".

E. L. Knoechel et al., "Instrumented Rotary Tablet Machines I-Design, Construction, and Performance as Pharmaceutical Research and Development Tools," J. Pharm. Sci., vol. 56, Jan. '67, No. 1, pp. 109-115.

K. Ridgeway et al., "Automatic Control of Tablet Weight," The Pharm. J., Mar. 24, 1973.

Goodhart et al., "Instrumentation of a Rotary Tablet Machine;" Journal of Pharmaceutical Science; vol. 57, No. 10, 1968, pp. 1770-1775.

*Primary Examiner*—Malcolm A. Morrison
*Assistant Examiner*—Errol A. Krass
*Attorney, Agent, or Firm*—Samuel L. Welt; George M. Gould; Mark L. Hopkins

[57] ABSTRACT

There is disclosed a method and apparatus for developing and controlling pharmaceutical granulations from a tabletting characteristics standpoint, involving instrumenting a tablet press to derive both the peak compression force and peak ejection force information for each tabletting event in convenient digital form. The thusly derived compression and ejection force information is automatically scaled to desired units of force and utilized in compression and ejection profiles and in the calculation of the average and standard deviations for both compression and ejection in the pursuit of optimization of the tabletted granulation regarding such tabletting characteristics as compressibility, lubricity, relative flow, compression failure point, and tendency of the formed tablets to adhere to the tablet press punches. In addition to the capability of distinguishing between the large-magnitude compression peaks and the relatively very small-magnitude ejection force peaks in the raw analog signal generated from a force transducer mounted on the tablet press, there is provided the capability of measuring ejection force peaks relative to a plurality of selectable reference levels, which enables the granulation formulator to take into account the residual force aspects found to exist following compression and prior to ejection of a formed tablet.

13 Claims, 20 Drawing Figures

TABLET PRESS RELATED INSTRUMENTATION FOR USE IN DEVELOPMENT AND CONTROL OF FORMULATIONS OF PHARMACEUTICAL GRANULATIONS

This is a division of application Ser. No. 610,706 filed Sept. 5, 1975, now abandoned.

CROSS-REFERENCE TO RELATED APPLICATION

This application is related to co-pending U.S. application Ser. No. 581,459 now abandoned filed May 28, 1975, the subject matter of which, insofar as it is pertinent to the instant application, is incorporated herein by reference.

BACKGROUND OF THE INVENTION

This invention relates to the generation in convenient form of objective data from tablet presses, which information is particularly useful in the development and control of pharmaceutical granulations from the standpoint of tabletting characteristics, and more particularly relates to measurement and processing of the compression and ejection forces developed in tabletting machines and the use of this information in the development and optimization of tabletted pharmaceutical granulations. The tabletting characteristics herein contemplated comprise compressibility, lubrication as it pertains to die wall-adhesion, tendency to laminate or cap, flowability of the material, and tendency to stick or adhere to the punch surfaces following tablet formation.

The value of instrumenting tablet presses for investigating the fundamental aspects of tabletting has been clearly recognized for some time. The reader is referred, for example to Higuchi et al "The Physics of Tablet Compression III; Design and Construction of an Instrumented Tabletting Machine", *Journal American Pharmaceutical Association, Sci. Ed.* 43, 322–348, 1954; and Knoechel, et al, "Instrumented Rotary Tablet Machines I", *Journal of Pharmaceutical Sciences,* Vol. 56, No. 1, January 1967.

This technology has been refined and commercialized primarily as a production control tool to automatically adjust tablet weight (for example, U.S. Pat. No. 3,255,716, "Measurement of Forces Within a Tabletting Machine"; U.S. Pat. No. 3,507,388, "Apparatus for Sorting Tablets"; and U.S. Pat. No. 3,734,663, "Arming Control for Servo-Adjusted Tablet Compression Machines"). Up to now, there has been little refinement of the basic technology to provide a pharmaceutical development tool which is accurate, fast and simple to use.

Previous technology in tabletting instrumentation as a development tool has the drawback of being awkward and difficult to use, in that it required, in addition to a sensing device (e.g. a strain gauge arrangement) being installed on a tablet press, that the raw analog signals from that sensor be either displayed on an oscilloscope or recorded on an oscillographic recorder. Such is demonstrated, for example, in British Patent Specification No. 1,216,397, "Improvements In or Relating to Tablet Forming Machines". It was then necessary to measure the peaks of the obtained traces (usually manually) and convert the values to force values. These values were then tabulated and the average and standard deviation were calculated. One could in this way, with appropriate equipment selectivity and sensitivity, measure and process the ejection force information. Attempts along these lines hve also proven to be, overall, a very time-consuming and tedious process. Reference here to equipment selectivity and sensitivity concerns the additional problem of obtaining a clear "signature" or pickup of the ejection forces, i.e. identifying the ejection peaks from all other portions of the analog signal, which signal may very well have significant noise or interference riding thereon. The substantial problem of automating the identification and processing of the ejection force peaks of the analog waveform is put squarely in prospective when one considers that ejection information is to be obtained from an analog waveform in which the compression peaks have a magnitude in the vicinity of twenty-five to fifty times the magnitude of the ejection force.

Additionally, generally speaking, commercial efforts in this technology area have been limited to the objective of obtaining a running average of the peak compression forces alone, whereas it is deemed most desirable to provide for the measurement and processing of the compression force and also the ejection force for each tabletting event.

In the pursuit of the highly desirable concept of utilizing compression and ejection force information, individualized to each tabletting event, as a development tool in particular, the benefits of providing this information in digital form, which is easy to interpret, easy to relate and to establish limits relative thereof, are quickly recognized.

More particularly, compression and ejection force information should be provided in a form that may be readily employed to generate for example compression and ejection profiles, which in turn enable the formulator to easily and quickly derive information concerning relative compressibility, relative flow of the material, relative lubricity, and other tabletting characteristics. It is to be noted that certain of these tabletting characteristics are interrelated, as for example, the situation wherein the addition of a lubricant to a formulation to effect proper tabletting will have an effect on the compressibility of that formulation. Sufficient information is, by this invention, now made available to the formulator in a convenient form to enable quick determination of the proper amount of lubrication additive to achieve a "best of both worlds" solution.

It is moreover, of very sustantial benefit to the formulator to have available information regarding the average and standard deviation of a number of successive tablets as to both compression and ejection aspects to enable optimization of a particular formulation in the development phase from a tabletting characteristics standpoint.

It is, in addition, of considerable concern to the formulator to be able to evaluate new formulations (and also perhaps competitive formulations) and to optimize such formulations with regard to tabletting characteristics with only a minimum amount of material available. All too often, a tabletted formulation has to be finalized and optimized at a very early stage in the total picture leading to the marketing of an acceptable tabletted drug product. Normally, initial batches are employed in very expensive clinical trials, the data from which is to be used for example in new drug application filings and the like to gain Governmental approval of the product. Demands are thus made on formulators to come up with a final formula before substantial quantities of the product are available to work with.

SUMMARY OF THE INVENTION

It is, therefore, a principle objective of this invention to provide a method and means of providing and carrying out the aforementioned desirable aspects leading to the development of improved pharmaceutical granulations, while at the same time eliminating or minimizing the above-mentioned drawbacks or shortcomings of the prior art.

More particularly, it is an object of this invention to enable development of new tabletted pharmaceutical formulations with better physical and processing characteristics.

A further objective of this invention is to provide compression and ejection force information in digital form for enabling fast and simplified profiling of a granulation.

It is yet another object of this invention to provide instrumentation deriving compression and ejection force information from a tablet press for use as a development tool in optimizing tabletted pharmaceutical formulations from a tabletting characteristic standpoint.

It is yet a further object of this invention to provide compression force and ejection force tabletting information in a digital form which is easily interpreted and evaluated and in a form readily usable to derive data on and to optimize a particular material or materials as to relative compressibility, relative lubricity, tendency of formed tablets to adhere to the press parts, relative flowability, and failure point (for example, capping, lamination or maximum compressibility), and to derive this information in substantially less time.

It is another object to enable evaluation and optimization of formulations in terms of tabletting characteristics with only a minimal amount of material available.

According to the broader aspects of this invention there is provided a method for profiling a granulation comprising instrumenting a tablet press to enable sensing and measurement of the compression and ejection forces occurring during tabletting of the granulation; deriving discriminately therefrom in digital form the peak compression force and peak ejection force for each tabletting event occurring in the tabletting of the granulation; and providing therefrom profiles of predetermined tabletting characteristics for said granulation.

Also, according to the broader aspects of this invention there is provided apparatus for use in the development of tabletted granulations comprising first means mounted on a tablet press for sensing the forces effected in the tabletting of a granulation and for generating therefrom an analog signal containing compression force and ejection force peaks; second means connected to said first means for converting said analog signal to a digital representation thereof; and third means responsive to said second means for automatically distinguishing compression force from ejection force for each tabletting event and for individually driving in digital form the compression force and ejection force for each tabletting event.

According to the invention, compression and ejection forces for each tabletting event, that is, those forces developed during tablet formation in and ejection from the tablet die of, for example, a single punch tablet press, are sensed by for instance a piezoelectric force transducer installed in association with the press lower plunger. The transducer output voltage is fed to a processing unit to derive discriminately the peak compression and ejection force information from the total analog signal from the transducer, which is converted to digital form and displayed and recorded. This compression and ejection force information as provided in digital form is then employed to establish correlations between tabletting characteristics in the development of an optimum formulation. From the data provided by this invention, determination of the rank order of the following tabletting characteristics for virtually any group of pharmaceutical granulation may be made: compressibility, lubrication as it pertains to the wall adhesion, flowability, tendency to fail (i.e. laminate, cap or compress no further), and tendency of the tablet to stick to the punch surfaces following the compression cycle of a tabletting event.

The invention provides the user with complete and accurate information on compression and ejection force for each tabletting event in convenient digital form directly in units of force (lb, kg, etc.), which information was heretofore available only in the form of an oscillographic recorder output (or the like). Apparatus according to the invention is readily capable of discriminating between the large compression force signal and the comparatively very small ejection force signal developed for each tabletting event, and to produce in response thereto respective adjusted digital signals in desired units of force, and simultaneously display and print the same. Scaling control for providing the user with a choice of units in which both compression and ejection forces are to appear, are included.

The versatility of the apparatus incorporating the invention is demonstrated, for example, by the fact that the operator can now conveniently visually dial changes in the compression force via the press controls. The electronics package is such as to provide a range of operation to include virtually all standard piezoelectric sensors. It is to be understood, however, that other suitable types of sensors may also be employed.

The benefits to be derived from this invention are numerous, as for example, development time and materials can be reduced through the ability of optimize formulations, minimizing scale-up trials. New raw materials can be more thoroughly characterized for tabletting properties and in considerably less time. Improved tablet formulation would, of course, ultimately lower production costs by minimizing secondary processing steps, enabling tablet presses to operate at higher speeds, and extend tool life. The invention may also be utilized as a quality control tool for raw materials. Apparatus according to the invention may also be used for routinely running profiles on small samples of a production granulation from time to time to see if there are changes (deterioration or improvement) in the product with time.

There is also provided, for more convenient operation, the facility that the ejection force can be read to several selectable baselines, which, for example, enables the operator to take into account possible positive or negative residual forces being experienced in the analog output signal from the force transducer following the compression cycle and preceeding ejection of the tablet.

The compression force information derived through this invention can be easily and quickly related to tablet hardness information to develop compressibility profiles. Different materials or formulations or different batches of the same formulation can be conveniently compared by such compresibility profiles.

Virtually every tabletted material experiences, beyond a certain amount of compression force a tendency to fail, i.e. it has a tendency to laminate or cap or will not compress further. The point of failure in compression force is easily determinable from the digital compression force information derived by the invention and applied in a compressibility profile.

Tablet-to-tablet variation regarding compression force (and, too, ejection force) is an indication of the relative flow of a material into the die cavity. Relative flow information is derivable in instances where uniformity of mixture of the material is maintained and the tablet press provides the same tabletting movement for each tablet produced. That is, where significant variation is obtained in compression force from tablet-to-tablet, with a material which is uniform in mixture and where all factors remain constant on the press itself (e.g. punch movement), the flow of the material becomes the factor giving rise to the variations, and it is analyzable as the presence (or absence) of more or less material introduced into the tablet die, which necessarily affects the compression force readings.

Information regarding relative flow of the material is obtained ultimately through derivation of the average and standard deviation of the force information over a series of successive tabletting events. The invention includes means for calculating the average and standard divation of both the compression force data and ejection force data. This information is automatically fed to conventional calculator circuitry either incorporated per se into the electronics package or constituting advanced type pocket calculators interfaced via automatic mechanical feed means. This eliminates the tedious and error prone process of manual transfer of data to calculator equipments to obtain the average and standard derivation, which factors are essential in obtaining a full profile of tabletting characteristics.

Moreover, from the combined compression and ejection force data profile can readily be generated from which information may be derived regarding relative lubrication and ease of ejection of a tabletted material. Hard information on this important parameter area is now available to the formulator at the earliest stages in the developement of a pharmaceutical granulation, enabling early optimization of the lubrication system in conjunction with other tabletting characteristics such as tablet hardness and compressibility.

A further feature of the invention is its availability as a means for evaluating different granulating equipments, wherein it may be determined which of a series of competitive equipments provides the best tabletting characteristics for a particular granulation.

BRIEF DESCRIPTION OF THE DRAWINGS

The above mentioned and other objects and features of this invention will become more apparent by reference to the following description taken in conjunction with the accompanying drawings, in which.

DESCRIPTION OF THE PREFERRED EMBODIMENT(S)

Figure 1:
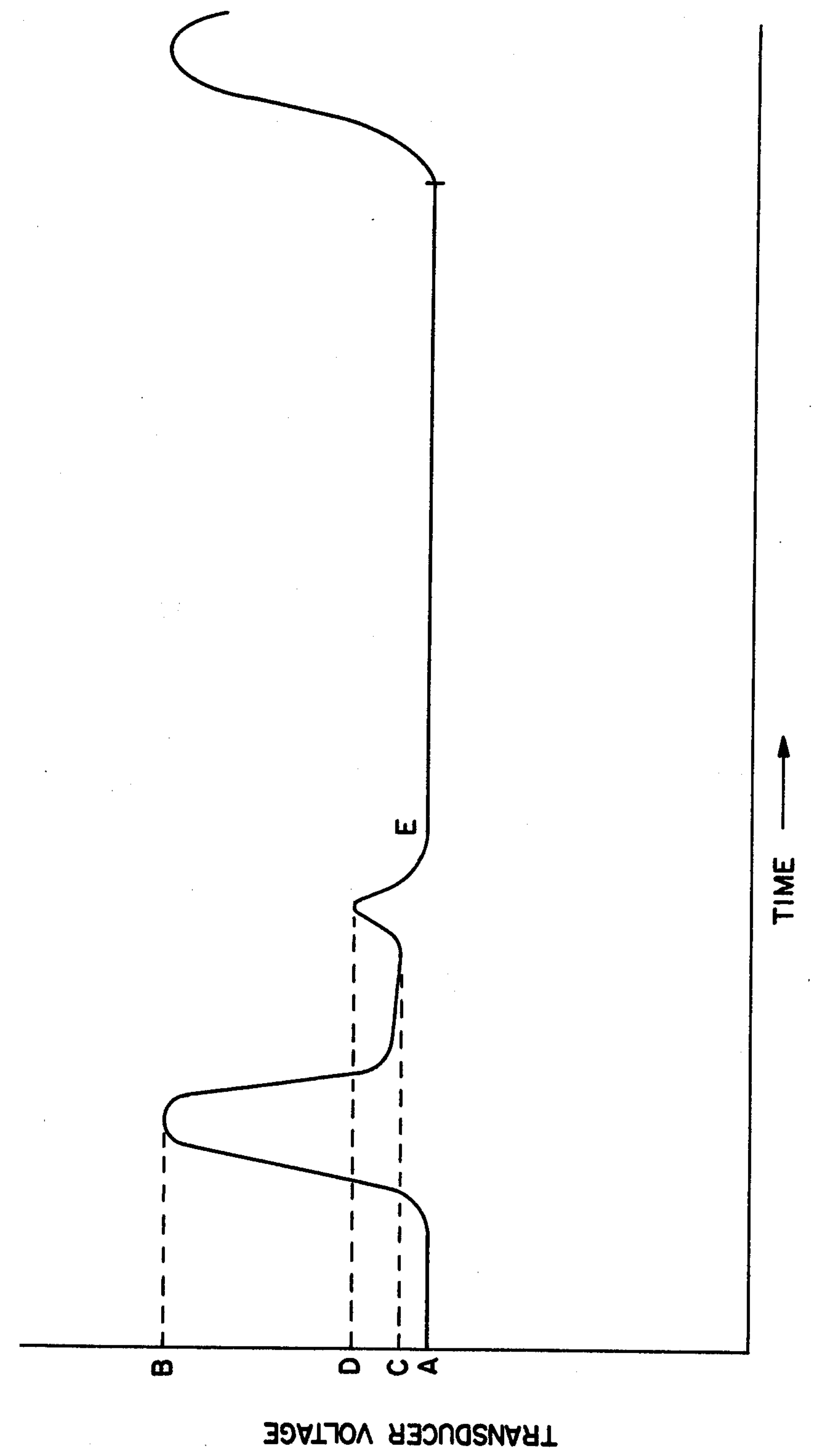
FIG. 1 is a graphic illustration of the analog output of the force transducer mounted on a tablet press, depicting a complete tabletting event including compression and ejection peaks.

The present invention arose as an extension in technical developement over co-pending U.S. application Ser. No. 581,459, which relates to instrumentation for measuring the peak force (peak force [as normally used] refers to the maximum lower punch force measured during tablet compression) developed during the compression cycle and digitally displaying and recording this value for each tablet. The invention of said copending application has particular use as a production control device to ensure that the "release rate" of the tablets will be correct, through monitoring of the compression force.

It has been found that rank order compressibility of various granulations can be determined simply by compressing tablets from each granulation at various compression forces and then determining the hardness of each. These data can be plotted graphically. The resulting graph(s) generally exhibit(s) the linear relationship between peak compression force and hardness, as shown, for example, in FIG. 2. Illustrated therein is the relationship between compression force and tablet hardness for a first granulation A. Data for another granulation, i.e. granulation B, may also be determined and plotted on the same graph, as shown. It is apparent from FIG. 2 that the higher curve (curve A) has better compressibility since, at any compression force, a harder tablet resulted, or an equally hard tablet can be made at a lower compression force.

It has been noted that some poorly compressible materials do not maintain a linear relationship between compression force and hardness over the entire compression force range. It has been noted further that in some cases the curve levels off and sometimes drops as hardness fails to increase with an increase in compression force. This is an indication of tablet failure caused by capping or lamination, or, in general, the failure point of a formulation being reached at which it can be compressed no further. Such has been symbolically illustrated in FIG. 2 as the dashed line extension to the graphed linear line for granulation B. It is to be understood that it is considered as being well within the scope of this invention to provide that the compression and ejection force information derived in digital form may be fed into and automatically graphed by a suitble computer using, for example a "Calcomp" plotting program, alternative to, for example, the manual plotting of this information.

It has also been determined that materials with good flow characteristics will generally produce a series of consecutive force peaks which are nearly the same. Since the distance between the punches of a tabletting machine, such as a single station machine, is constant at the point of peak compression, the only factors that can cause variations in the compression force are the amount of granulation fed to the die and the uniformity of mixture of the granulation itself. This variation is expressible in terms of the standard deviation of the peak compressive force for a number of tablets. The greater the standard diviation of one tablet group, the greater the variation from tablet-to-tablet, and, hence, the greater the variation in powder flow characteristics and/or uniformity of the material, including particle size distribution. Assuming that uniformity of the material is maintained, tablet-to-tablet variation is directly relatable to variation in powder flow characteristics.

The above is based upon the face that with the press mechanics being constant, one should derive with the same amount of uniformly mixed material the same compression results tablet after tablet. Thus, with the uniformity content of a material being maintained, along with the press mechanics remaining constant, a series of consecutive compressions should have a very small standard deviation. However, in a situation of non-uniform flow, the result will be a larger standard deviation on consecutive tabletting. For example, if two runs were made on different batches of the same material where the first was found to have a standard deviation over a certain number of consecutive tablets of 120 pounds of compression force, and the second run of a similar series of consecutive tablets developed a standard deviation of say 240 pounds one can say that the second run has a poorer flow relative to the first run if the material is otherwise uniform in mixture. Armed with this information, the operator would quickly recognize the need to add say a glidant (lubrication, e.g. talcum) to the granulation.

Figure 2:
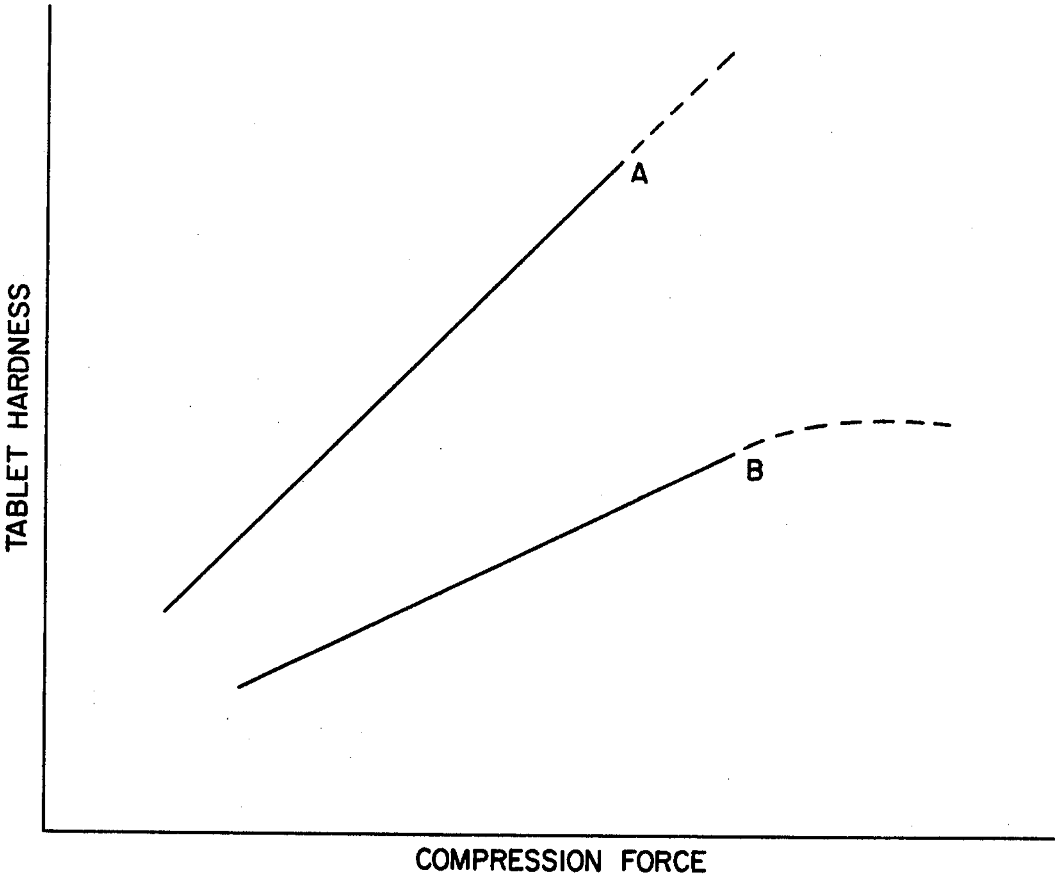
FIG. 2 is a graphic illustration of compression force information versus tablet hardness for two tabletted granulations A and B.
Figure 3:
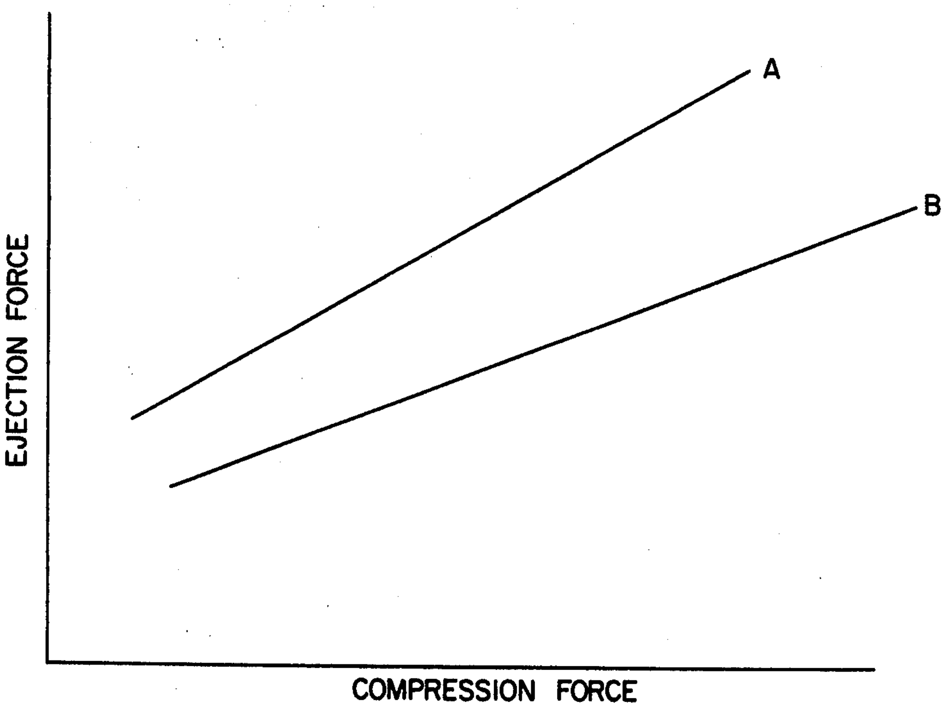
FIG. 3 is a graphic illustration of ejection force versus compression force for the two tabletted granulations A and B.

FIG. 3 graphically illustrates the general linear relationship which exists between peak compression force and peak ejection force, for the granulations depicted in FIG. 2, as tabletted, for example, on a Stokes Model F Tablet Press. The relationship between compression and ejection forces for a formulation indicates that rank order of lubrication characteristics may also be determined for granulations by plotting peak compression force versus peak ejection force. FIG. 3 illustrates that the better lubricated batch (curve B) is the one which has a lower peak ejection force for the same peak compression force through the entire normal range of compression forces.

The determination per se of the relative tabletting characteristics just described is not particularly unique. Similar data have previously been determined, as indicated, for example, in U.S. Pat. No. 3,255,716. However, in the present invention, the data is accumulated digitally. These data are obtained rapidly and simply, as opposed to thos obtained by oscillograph which are very time-consuming to extract.

The concept of a new type of instrument has, therefore, been pursued which would take the signal from a sensor installed, for example in the lower punch holder of an operating single punch machine and transmit same to an electronics package which would then uniquely discriminate the relatively large compression force from the small ejection force for each tabletting event and digitally display and record the peak values of both in pounds or kilograms of force at speeds substantially equal to the rate of the tablet press.

Reverting again to the consideration of relative lubrication and ease of ejection of a tabletted granulation product, most often a granulation is either uncompressible or poorly compressible in its so-called purest state. That is, without a lubricant one either cannot physically make a tablet or the tablets will bind in the tablet die itself. Introducing a lubricant into the granulation, or increasing the level of lubrication will, of course, reduce the ejection force, but it should be recognized that at the same time as the lubricant is added, the lubricant itself is very poorly compressible. Thus, while lubrication is of benefit from an ejection standpoint, it has a tendency to adversely affect (i.e. reduce) compressibility. The formulator is then faced with the problem of optimizing the amount of lubrication to get effective lubrication but at the same time not substantially reduce compressibility. Now, in accordance with the invention, a formulator is easily able to do so by relating the information contained in the curves illustrated in FIGS. 2 and 3 which have been quickly and conveniently generated. This will be covered in greater detail below in connection with a discussion involving FIGS. 4 and 5.

A particular phenomenon, believed to be heretofore unreported, has been found to exist as part of the overall tabletting event. This phenomenon is a residual force which has been found normally to occur following compression and proceeding ejection. This residual force during the dewll time between the compression and ejection cycles is associated with the lower punch of the press.

The total analog waveform for a tabletting event as illustrated in FIG. 1 shows the residual force as voltage level C. It has been determined from a plot of the residual force versus ejection force, at least over a normal range of different compressions, that the relationship between residual force and ejection force is linear.

A major significance of this residual force phenomena is that it could directly affect the accuracy and validity of the ejection force reading. By this is meant that with a lower punch sensor, if the electronics processing package is designed on the premise that the dwell force between compression and ejection cycles is the same as at the beginning of a tabletting cycle, i.e. the reference of zero force, and the reference for measuring ejection force from the transducer output signal is established during the dwell period between compression and ejection, then readings will normally occur for ejection which will not be referenced to zero force. Since decisions are to be made by the formulator regarding for example the optimization of the lubrication system of a granulation, and since such decisions are based upon ejection as well as compression force profiles, it is deemed highly prudent to provide the formulator with information as to what baseline ejection force is being measured against. More particularly, it is highly desirable to provide means whereby the formulator can take ejection force data relative to more that one baseline reference, merely by changing a mode or selector switch. In accordance with the invention, there is provided the capability of selecting one of several baselines in the generation of ejection force data. This will be described in more detail hereinafter, particularly in connection with the electronics package.

With the above in mind, attention is called to a phenomena somewhat opposite to residual force, occurring during the dwell period of the tabletting cycle. Whereas residual force constitutes a small downward force on the lower punch after the upper punch begins to lift away, it sometimes occurs that newly formed tablets of a particular formulation have a tendency to adhere to the retreating upper punch. This, in turn, will decrease any resultant residual force, and if the tendency to adhere is substantial, the residual force quite conceivably could be entirely compensated. Moreover, a situation of "negative" residual force may occur. In referring to FIG. 1, it will be noted that DA (the peak ejection force voltage relative to "zero" force baseline A) will normally be greater than DC (the ejection force relative to the residual force baseline C) as long as the residual force is being experienced. However, with the situation of the tablet tending to adhere to stick to the retreating upper punch, conceivably it may result that level C is less than the level A, i.e. DA < DC, thus giving rise to a potential cause of wandering baseline in the measurement of ejection force. As the operator is provided, in accordance with the invention, with the capability of selecting DA or DC (and one other selection, as hereinafter described) for the ejection force, the problem of sticking tablets may be easily and quickly discovered, with the invention thus being applicable as a screening device in this regard.

The remedy for such a condition, of course, is to add an antiadherent type of lubrication to the granultion being tabletted. From a development standpoint, the amount of antiadherent lubrication needed may be optimized in the early stages of development of the granulation, thus substantially eliminating this problem from the production environment.

In the following, more specific examples of consideration of the above-mentioned tabletting characteristics are discussed and illustrated. For example, one may generate a compressibility profile, i.e. tablet hardness versus compression force on one of the raw material components of a granulation, for example, lactose. The compression force and hardness information from two or more different kinds or sources of lactose may be obtained and plotted on a single graph, thus showing at a glance the relative compressibility of the various lactoses.

One might wish to add a substance to one or more of the different lactoses to find out whether it would improve the compressibility thereof, and if so to what extent. By this invention, profiles may be generated on each lactose provided with the same amount of compressibility additive, to quickly and easily evaluate the results of these combinations and determine inter alia the best combination. It can be shown, for example, whether, with the same amount of additive, the resulting tablets retain the same rank order of compressibility as found from the tabletting or the lactoses by themselves. This has been found normally to be the case.

Figure 4:
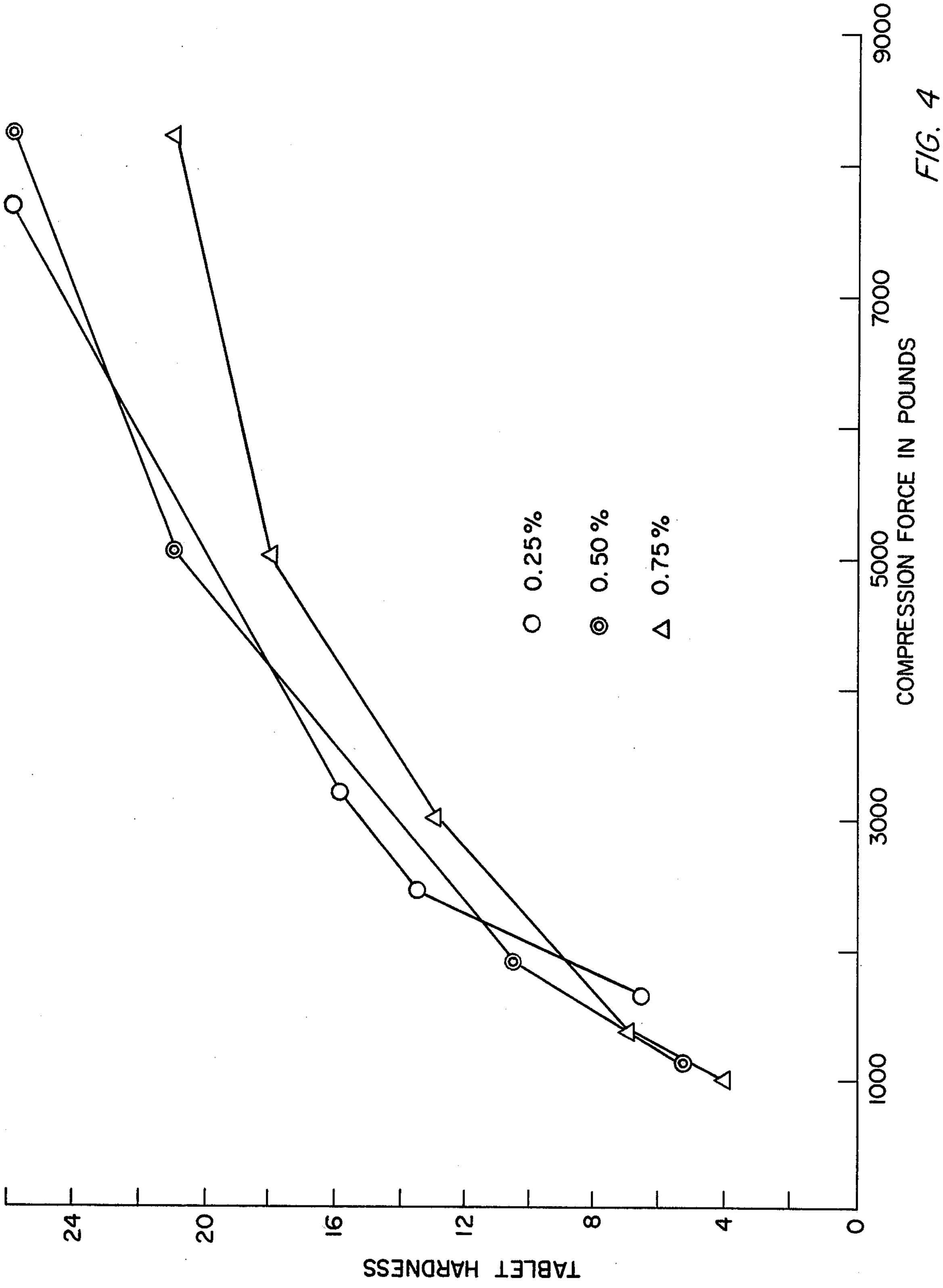
FIG. 4 is a graphic illustration of compression force versus tablet hardness showing the effects of three different levels of lubrication on successive runs of the same tabletted granulation.
Figure 5:
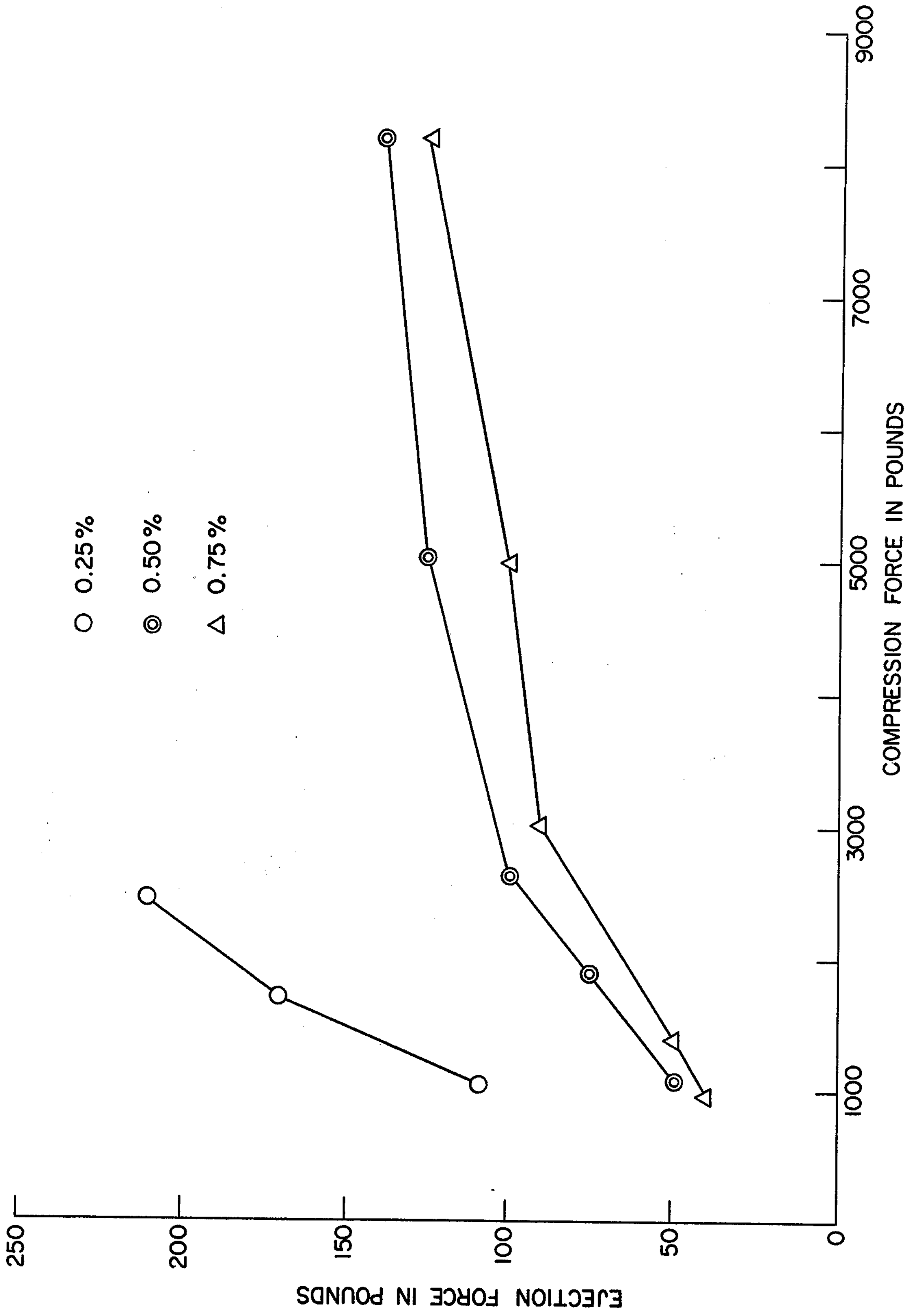
FIG. 5 is a graphic illustration of ejection force versus compression force depicting the effects of the various lubrication levels on ejection for the same granulation runs depicted in FIG. 4.

The potential of the compression and ejection force profiles is perhaps best exemplified by reverting again to the tabletting characteristic of lubrication. In this regard, reference is made to FIGS. 4 and 5. FIG. 4 is a compression profile showing the effect of the lubricant level on compression. FIG. 5 is an ejection profile also showing the effect of that same lubricant level on ejection force. FIG. 5, first of all, demonstrates that while the 0.25% lubricant level may very well provide an acceptable ejection force level, the addition of only another 0.25% of the lubricant provides a substantial improvement (lowering) in the ejection force characteristic. Increasing the lubrication beyond 0.50% for this granulation does not significantly improve lubricity and ease of ejection. However, looking to FIG. 4, it can immediately be noted that increasing the lubricant level improves lubricity at the expense of compressibility. For example, in FIG. 5 the 0.25% level derives poor ejection properties since a relatively small increase in compression force gives rise to a substantial increase in ejection force. In contrast, the 0.50% and 0.75% levels of lubrication derive good ejection properties since substantial increases in compression force give rise to only slight increases in ejection force. In comparison, FIG. 4 demonstrates that while all three levels of lubrication provide acceotable compressibility properties, the highest level, i.e. 0.75%, provides the least acceptable compressibility properties, the 0.75% level deriving compressibility properties significantly poorer than the other two levels. Viewing the two graphs together, though, enables the formulator to quickly realize that for this particular granulation, a 0.50% lubrication level will provide good lubricity without significant loss in compressibility.

It should also be pointed out that similar information may be derived and quickly evaluated regarding the effects on ejection and compressibility of the choice of lubricant.

Figure 6:
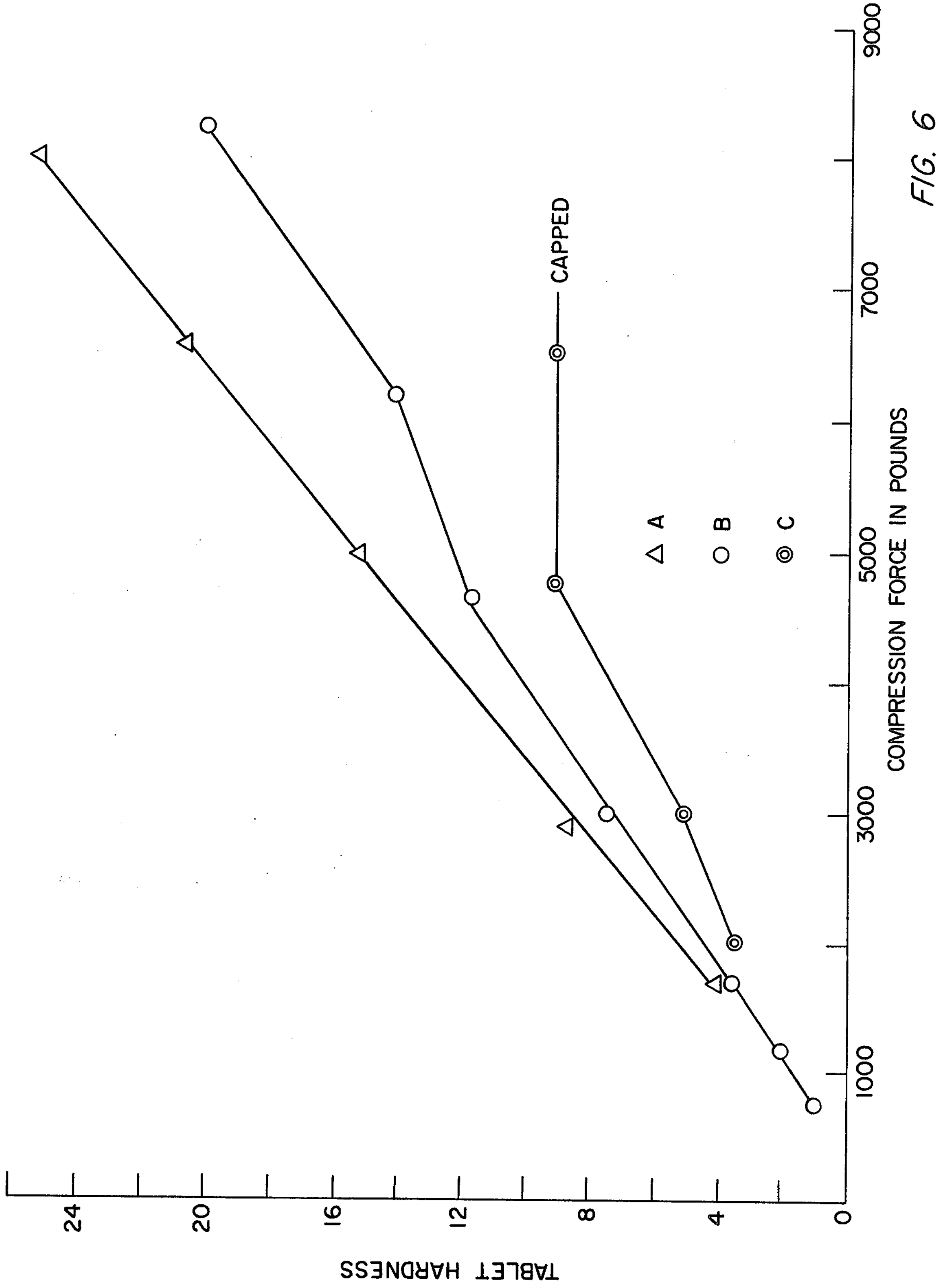
FIG. 6 is a graphic illustration of compression versus tablet hardness for the same granular formulation produced on three different granulating equipments A, B and C.

A further and potentially very significant use of the invention involves the evaluation of the performance of different granulating equipments. For example, in FIG. 6, there is depicted and compressibility profile showing the actual results conducted on a particular granular substance, wherein the product has been prepared using three different granulating equipments. The profiles of FIG. 6 show that the product produced by equipment A is superior in compressibility characteristics to equipments B and C, and, moreover, it is shown that the granulation prepared by equipment C is unacceptable because of poor compressibility and tendency to cap. Of course, this evaluation of the different equipments is only valid for the particular product being granulated. Similar equipment studies could just as easily and quickly be conducted for each material to be evaluated.

The above examples indicate that one may by this invention quickly and accurately provide useful data through rank-order comparisons of granulations for the purposes of:

1. development of new products
2. scale-up
3. optimization of manufacturing processes
4. equipment evaluation
5. raw material evaluation
6. resolution of pharmaceutical production problems
7. quality control of products
8. research tool.

A specific detailed example of a profile determination is given in the following. With the tablet press instrumented in accordance with this invention, one would first obtain granulation for a small minimum number of tablets, say 500 tablets. Preparatory to actually tabletting the granulation itself, the press would be adjusted for desired tablet weight and appropriate speed. The compression force of the tablet press would then be adjusted to some desired initial level, such as for example 1000 pounds compression per tablet, which setting incidentally may be made and/or verified by way of the compression display portion of the digital readout indicator of the apparatus of the invention while the press is running.

Next, one operates the apparatus of this invention to record the compression and ejection forces for an appropriate number of consecutively produced tablets, say nominally thirty tablets. Following this, the compression and ejection force information, which has in the meantime been automatically transferred to calculating means, is used to determine and record the average and standard deviation for both the maximum compression and ejection forces. The displayed and recorded individual compression and ejection force readings for each tabletting event and the average and standard deviation information are either automatically transferred to a suitably programmed computer to provide, for example, graphical printouts (as alluded to hereinbefore) or can be manually transferred to suitable data sheets for later manual profiling.

The operator may now determine the harnsess of say ten of the thirty tablets compressed during the first run, using a suitable hardness tester such as is described generally in the above-referenced co-pending U.S. patent application. These hardness values are then also fed into the computer or recorded on the data sheets for latter manual processing.

At this point, the compression force setting of the press is readjusted to say 2,000 pounds of compression force, and the above process is repeated. The same sequence would then be performed for various other compression force settings, and each time the results derived in digital form are recorded and/or are otherwise forwarded to the computer. The range in actual values of compression force settings used will, of course, depend on the needs of the formulator.

At this point one may wish to run additional profiles on granulations to be compared with the first material, keeping the press speed, tooling and table weight the same.

Turning to the apparatus aspects of the invention, the tablet press is instrumented with a force transducer sensing device 10, for example, substantially as shown in th above-referenced co-pending U.S. application Ser. No. 581,459.

In general, prior to the development of this invention and that of said co-pending application, tablet compression force measuring systems used in production environments have employed strain gauges attached to tension bars as the sensor elements. In particular, solid stage strain gauges have been used because of their higher signal voltages in comparison with wire of flow gauges.

Solid stage strain gauges have three major disadvantages for the applications contemplated herein. These are:

1. The signal voltage is on the order of fifty millivolts and the signal leads are susceptible to having voltages induced into them from spurious electronic noise sources. This may not be a major concern with a unit that uses an average analog signal. It should, however, be noted that it may introduce false readings when each compression and ejection pulse is analyzed, such as is accomplished in the present invention.
2. The output from a solid state strain gauge is nonlinear, and, when readings are to be obtained over an extended range, different signals-to-force calibration factors are required, depending on the magnitude of the output signal. In an application where both compression and ejection forces are measured, particularly for each tabletting event, it is highly preferably to have an output that is linearly related to force over an extended range.
3. The strain sensitivity of solid state strain gauges is affected by environment temperature. The change in gauge force for an N-type silicon solid state strain gauge is, for example, approximately 0.4% for a 1° C change in temperature. The temperature sensitivity of the typical example of piezoelectric load sensor for the present invention is approximately 0.04% per degree centigrade.

The type of sensor particularly utilizable in the present invention consists of a piezoelectric crystal element and a unity gain amplifier hermetically sealed inside a stainless steel enclosure. Power and signal voltage are transmitted through a single connector. The high output signal and linearity of the selected tranducer permit quantitative evaluation of tablet ejection force details as well as compression force. This is not generally considered practical with a strain gauge system because the ejection force is usually less than 1% of the design load.

The transducers, which are commercially available, are calibrated before delivery. The sensitivity value is unique to a specific transducer and is not affected by the current level supplied by the constant current power supply used to drive the unit. Consequently, a piezoelectric force transducer may be used with other similar constant current power supply units with no change in sensitivity.

Figure 7:
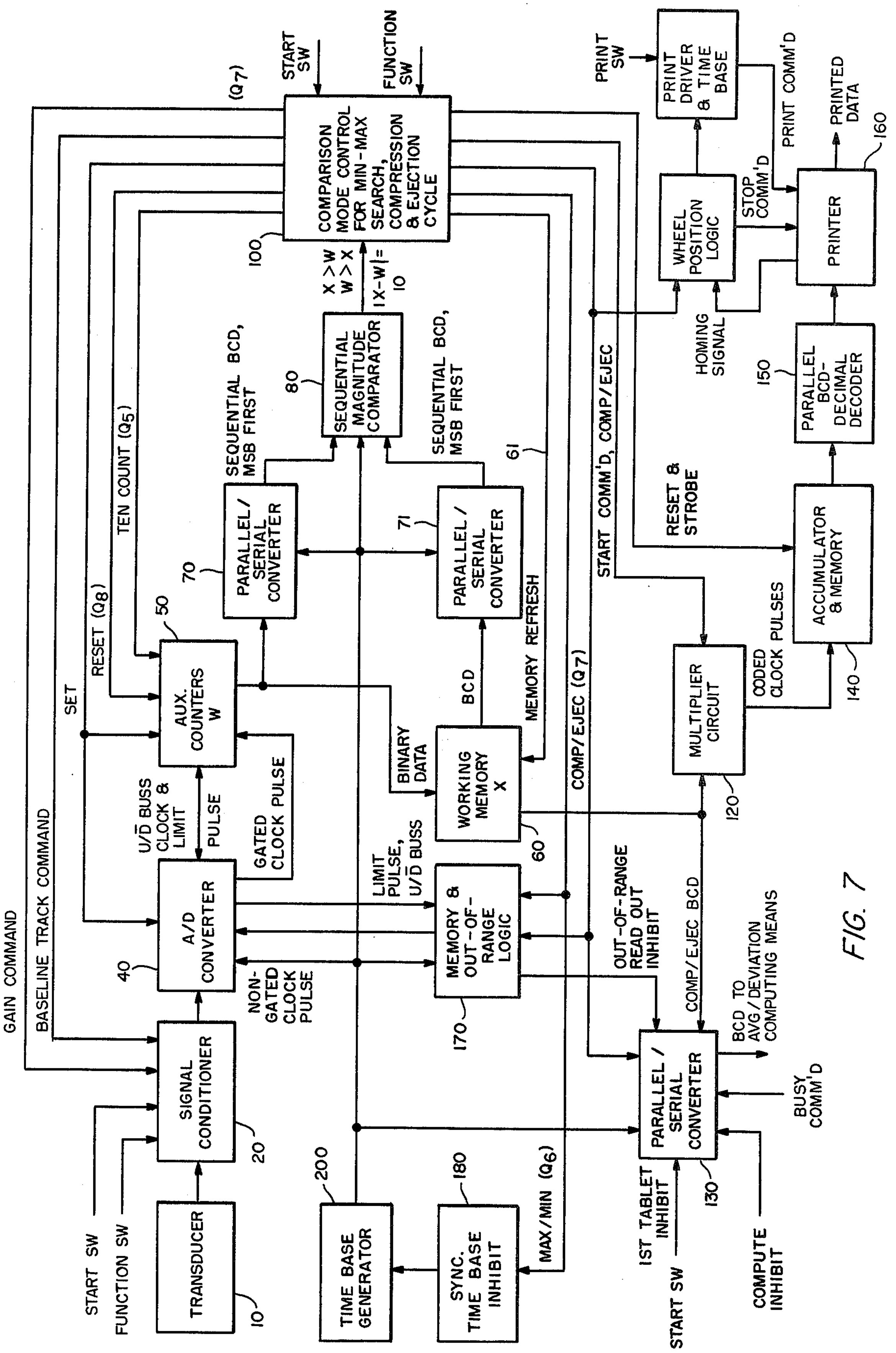
FIG. 7 is the main block diagram illustrating apparatus according to the invention.

The output analog signal waveform from the transducer is fed to an electronic package, which is generally illustrated in block diagram form in FIG. 7. There is provided a constant current to the piezoelectric transducer and a monitoring of the transducer's output voltage.

FIG. 1 shos the voltage output of the piezoelectric transducer. Point A is the voltage baseline of the transducer. This represents the voltage present at the transducer output with no force present, i.e. experienced by the transducer. This voltage can vary somewhat (typically from nine to twelve volts) depending on the transducer used.

Point or level B is the maximum voltage output of the transducer during the compression cycle (or portion) of the tabletting event depicted. This force is the result of the tablet punches compressing the formulation in the tablet die. While Point B corresonds to a maximum voltage of say ten volts above Point A (equivalent to a digital count of 999 in the example case depicted herein), the force this represents is a function of the transducer used.

Point C represents the voltage present at the transducer after the compression cycle and before the tablet has been ejected. This voltage, as hereinafter discussed, may or may not be the same as Point A.

Point D represents the voltage present at the transducer as the tablet is ejected from the die.

Point E represents the voltage at the transducer with no force being experienced by the transducer and is removed in time from Point A by essentially one full tabletting cycle.

The arrangement according to the invention provides a numerial readout of the compression and ejection peaks monitored by the piezoelectric transducer 10. This readout corresponds to the peak values of these pulses minus a significant baseline.

The electronics package is provided within an internal reference, which is usable as an internal calibration signal. The scale factor of the instrument may be varied from 0.01 UF/MV to 9.9UF/MV. UF is used as an abbreviation of unit of force, since the invention can provide a readout in pounds or kilograms, depending on what scale factor is selected and dialed into the electronics package. An automatic internal bias adjustment is also provided to eliminate the substantial bias in the transducer signal. In selecting the proper scale factor for the transducer being used, this may be accomplished by thumbwheel switches. That is, the scale factor switching constitutes a series of thumbwheel switches which allow the equipment to be used with force transducers having scale factors of 0.01 unit of force/mv to 9.99 unit of force/mv. For example, if the transduer scale factor is 0.9MU/lb, one could enter 1/(mv)/(0.9 lb) = 1.11(lb)/(mv) on the thumbwheel switches, and compression and ejection readout would automatically be in pounds.

Switching means may also be provided to enable the information to be printed out for a permanent record; the information is also read out visually. There is also provided a sequential readout interfacing with average/deviation computing means. This allows average and standard deviation to be automatically computed for both the compression and ejection forces measured.

The average and standard deviation computations may be accomplished for example, by two pocket calculators (e.g. HP-45's) which are placed in cradles provided with the average/deviation computing means, wherein the information from the electronics package is converted initially into mechanical impulses in order to enter same into the calculators. Alternatively, calculating circuitry may be provided to permit the digitalized information regarding compression and ejection peaks to automatically be transferred thereto and operated on without the need for mechanical conversion.

Figure 8:
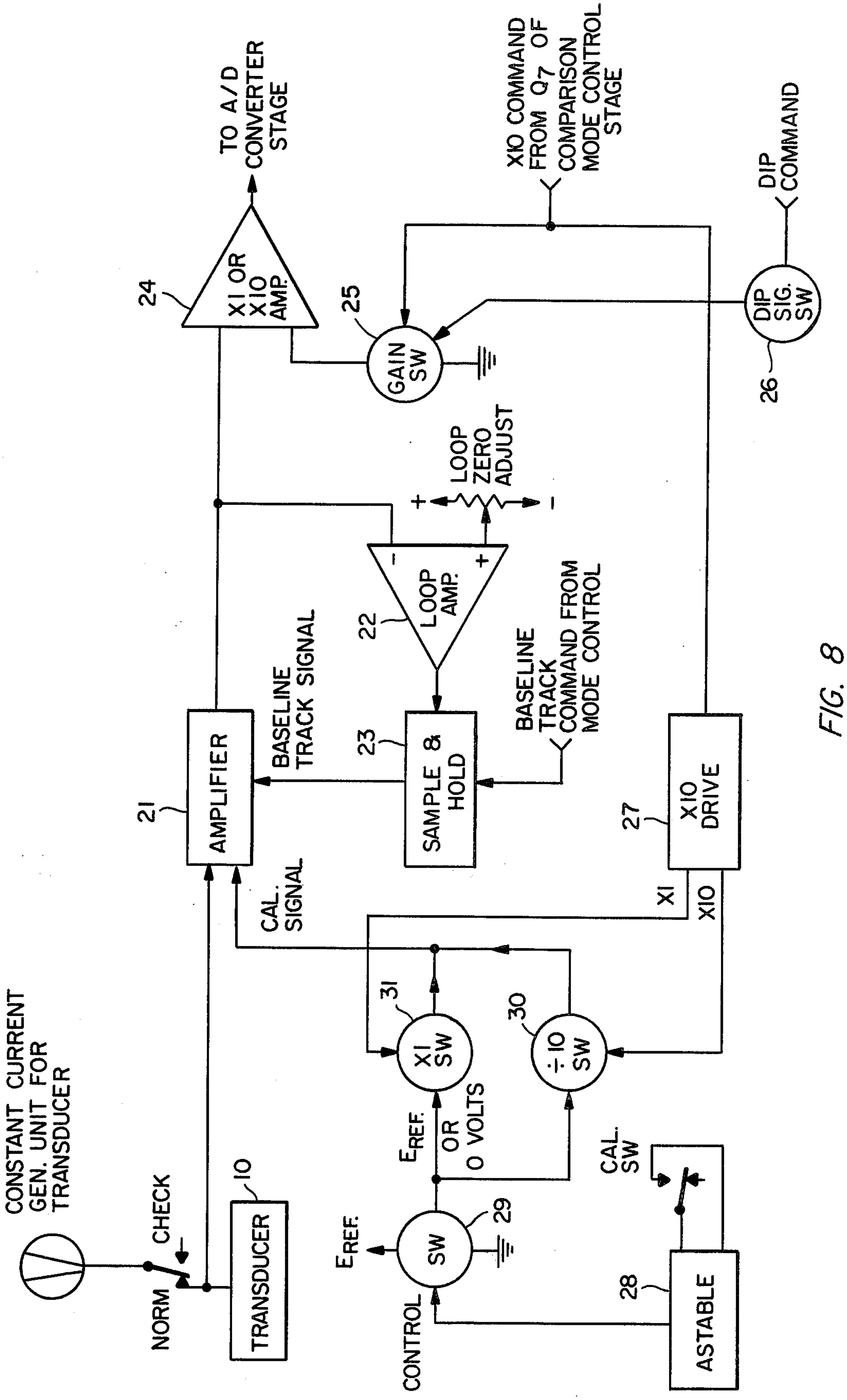
FIG. 8 is a block diagram depicting in greater detail the signal conditioner stage of the block diagram of FIG. 7.

The analog signal from the force transducer specifically is coupled into signal conditioner stage 20 (FIG. 7) which stage is more particularly defined in the block diagram of FIG. 8. Signal conditioner block 20 is shown as having several other leads running thereto. One is identified as "start sw.". A primary purose of the start sw. is to place the electronics in a comprssion baseline search mode.

A second lead to this signal conditioner block 20 is the function switch lead. The invention essentially provides two different measurements which are determined by a function switch. Switch position number II, provides a compression readout corresponding to Level B minus Level A (i.e. |BA|) in FIG. 1. The ejection readout corresponds to Level D minus Level A (i.e. |DA|).

Switch position I of the function switch provides a compression readout of Level B minus Level A and ejection readout of Level D minus Level C. This mode provides the same compression reading, but the ejection reading in switch position II is less than that in switch position I. This difference is exactly Level C minus Level A, or the difference between compression and ejection baselines, which takes into account the possible residual force occurring between compression and ejection.

A third mode, i.e. function switch position III, provides the same numerical readout as switch position II and is used where the ejection peak (Point D of FIG. 1) above the ejection baseline (Point C of FIG. 1) would be less than ten times the thumbwheel number setting of the scale factor thumbwheel switches. This function recognizes an ejection pulse situation which is less than the threshold used in switch positions I and II.

The signal from the transducer, as shown in FIG. 1, is a voltage with two distinct peaks and a substantial bias. The signal conditioner stage 20 eliminates the bias, inverts the signal, provides a gain of one during the compression cycle and a gain of ten during the ejection cycle. It also provides an internal, front-to-back calibration facility which enables the operator to ascertain at a glance whether or not the electronics package is operating properly.

The output of the signal conditioner stage 20 is coupled to an analog-to-digital converter stage 40 (FIG. 7). The analog-to-digital 40 changes the conditioned transducer signal into a digital number with a binary coded decimal (BCD) format. The A/D converter stage is more specifically defined in the block diagram of FIG. 10. As shown, A/D converter stage 40 includes a three-decade synchronous up/down counter arrangement 41 for housing the digital values of this stage.

A/D converter stage 40 is coupled to a stage called auxiliary counters W, which constitutes a counter arrangement similar to the three-decade synchronous up/down counter 41 associated with the A/D converter stage 40. When the function switch is in the position I mode, where ejection force is to be measured relative to the zero force baseline A, auxiliary counters W continuously receive the count of the three-decade counter arrangement 41 of the A/D converter stage 40. Auxiliary counters W stage 50 (FIG. 7) is coupled as shown by a complex line to working memory X stage 60, which periodically has information updated from auxiliary counters W stage 50 whenever a "memory refresh" command pulse is received on line 61 (FIG. 7).

The auxiliary counters W and working X provide the parallel information to the sequenced and compared by sequential magnitude comparator stage 80, which receives its information via respective parallel-to-serial converters 70 and 71. The magnitude comparator stage 80 performs the arithmetic functions $X > W$, $W > X$ and $|X-W| = 10$ on the information housed in auxiliary counters W stage 50 and working memory X stage 60.

The information resulting from the continuously performed functions of the sequential magnitude comparator stage 80 is fed to comparison mode control stage 100. The comparison mode control stage 100 decides inter alia what numbers are to be stored in working memory X and whether a peak or valley is occurring in the signal received from the transducer 10. Comparison mode control 100 also keeps tract of whether a pulse in the transducer analog signal relates to comparison or ejection force. Whenever the compression peak for a tabletting event has been ascertained by and under the control of the comparison mode control stage 100, the numerical representation thereof, as stored at that time in working memory X stage 60, is commanded out and fed to multiplier stage 120 (FIG. 7) and stored therein. This information, i.e. the pertinent peak values from memory X, is also transferred to and stored in the average/deviation computer parallel-to-serial converter stage 130. The same occurs with respect to the ejection force information. On command from the comparison mode control 100, the numbers stored in the parallel-to-serial converter 130 representing both compression and ejection force information are transferred to average/-deviation computing means (not particularly shown).

At the appropraite time the stored numbers in multiplier stage 120 are multiplied by the scale factor dialed in via the scale factor thumbwheel switches. The product output from the multiplier stage 120 is stored in accumulator and memory stage 140, and ultimately decoded via BCD-decimal decoder stage 150 to interface with the printer 160. As alluded to above, the arrangement first operates on the compression force information, which is processed and ultimately stored in stage 140. Following this, the ejection information is processed and ultimately arrives in the stage 140. A command from the comparison mode control stage 100 then initiates the print cycle, printing out both the compression and ejection force information simultaneously. In the example arrangement herein depicted, there are provided printer wheels which are pulsed until their position agrees with the decoded number from the accumulator memory stage 140. Following this a print pulse activates the print solenoid and the data is printed.

Various ones of the stages illustrated in FIG. 7 are coupled to a central clock source called the timing base generator 200.

Altough shown as a single connecting line in FIG. 7, the timing base generator 200 feeds various timing waveforms to the A/D converter stage 40, the parallel-to-serial converters 70, 71 and 130, the sequential magnitude comparator stage 80, and also to a stage called memory and out-of-range logic 170. This latter stage has the purpose of taking into account a situation where the signal from the transducer is high enough to go above the dynamic range of the A/D converter stage 40, i.e. greater than the digital count of 999, and also the similar situation where the signal conditioner output as derived from the transducer is slightly negative, i.e. wherein the A/D converter stage would be attempting to count digitally below zero.

One further block is known in FIG. 7, that being the stage identified as synchronous time base inhibit 180. The basic purpose of stage 180 is to inhibit the time base generator from providing clock pulses during the time the signal conditioner stage is changing gains (from a compression cycle situation to an ejection situation), which would otherwise provide transients that could be taken by the A/D converter stage 40 as legitimate compression or ejection pulse information.

In more specific description of the apparatus according to the invention, reference is again made to the signal conditioner stage 20.

Referring to the block diagram of FIG. 8, the output of the transducer is coupled to an amplifier 21 which has associated therewith an electronic loop comprising loop amplifier 22 and sample and hold unit 23. The purpose of this sample and hold loop is to correct the rather large (typically three to eleven volts) baseline out of the transducer 10 to zero volts, i.e. the signal conditioner applies a zero-volt reference to the baseline A of FIG. 1, not unlike the sample and hold technique employed in said co-pending application. A correction is provided every complete tabletting event as determined by the comparison mode control stage 100, which stage provides the baseline track command to sample and hold unit 23. With the electronics turned-on and the start switch actuated, the equipment automatically goes into a search mode for compression cycle baseline, preparatory to the search for the compression pulse.

The output of amplifier 21 is coupled to one input of an amplifying arrangement called the times one or times ten (X1 or X10) amplifier, the output of which is in turn connected to the A/D converter stage 40. The other input to the X1 or X10 amplifier 24 is connected to a gain switch 25 which, on the one hand, has no ground connection (gain of 1) and on the other hand has an input thereto from the comparison mode control stage 100 called the times 10 (X10) command (from $Q_7$ of CMC stage 100)(ie. gain switch 25 is closed providing ground connection through an appropriate resistor). Because the ejection pulse is much smaller than the compression pulse, a X10 increase in gain is provided by amplifier 24 during the ejection cycle of each tabletting event, which is effected by the gain switch 25 upon the occurrence of the X10 command.

Also connected to gain switch 25 is a dip signal switch 26. The purpose of this switch is to effect an artifical lowering of the baseline C (FIG. 1) when the function which is placed in the mode III position (used where the $|DC|$ value is very low, for example, approximately five digital counts in the example arrangement depicted herein). When position III of function switch is selected, the equipment provides a dip command signal to switch 26 following the compression cycle. The dip command, then, is used when the ejection pulse is to be read relative to its own baseline. This command forces the output of the amplifier in such a direction so as to condition the A/D circuitry 40 below that baseline and then look for the new peak.

The signal conditioner stage also provides a self calibrating feature via elements 27–31. When the Cal. switch is actuated a signal equivalent to 900 counts (9V) is provided both in the X1 and X10 gain positions of the amplifier. These signals are treated by the unit as if they are a 9V compression pulse and a 0.9V ejection pulse. This is effected as follows. In actuality, the calibration circuitry alternately yields 9V pulses for compression and 9/10 V pulses (squarewave pulses) to assimilate ejection. With the thumbwheel scale factor switches set at one, the operator should read 900 counts out for both compression and ejection if the electronics is performing correctly. Actuating the Cal. SW. provides power to astable generator 28 which provides a squarewave output to control switch 29. The squarewave output actuates the switch 29. When a positive peak of the astable output appears, switch 29 provides at its output $E_{refi}$ and a negative peak of the astable output provides ground or zero volts at the switch 29 output. Switch 29 has its output divided and leading to a times one (X1) switch 31 and a ÷ 10 switch 30. These two switches are alternately actuated under the control of the X10 command (representing the compression cycle is substantially completed) ultimately through a X10 driver circuit 27.

Figure 20:
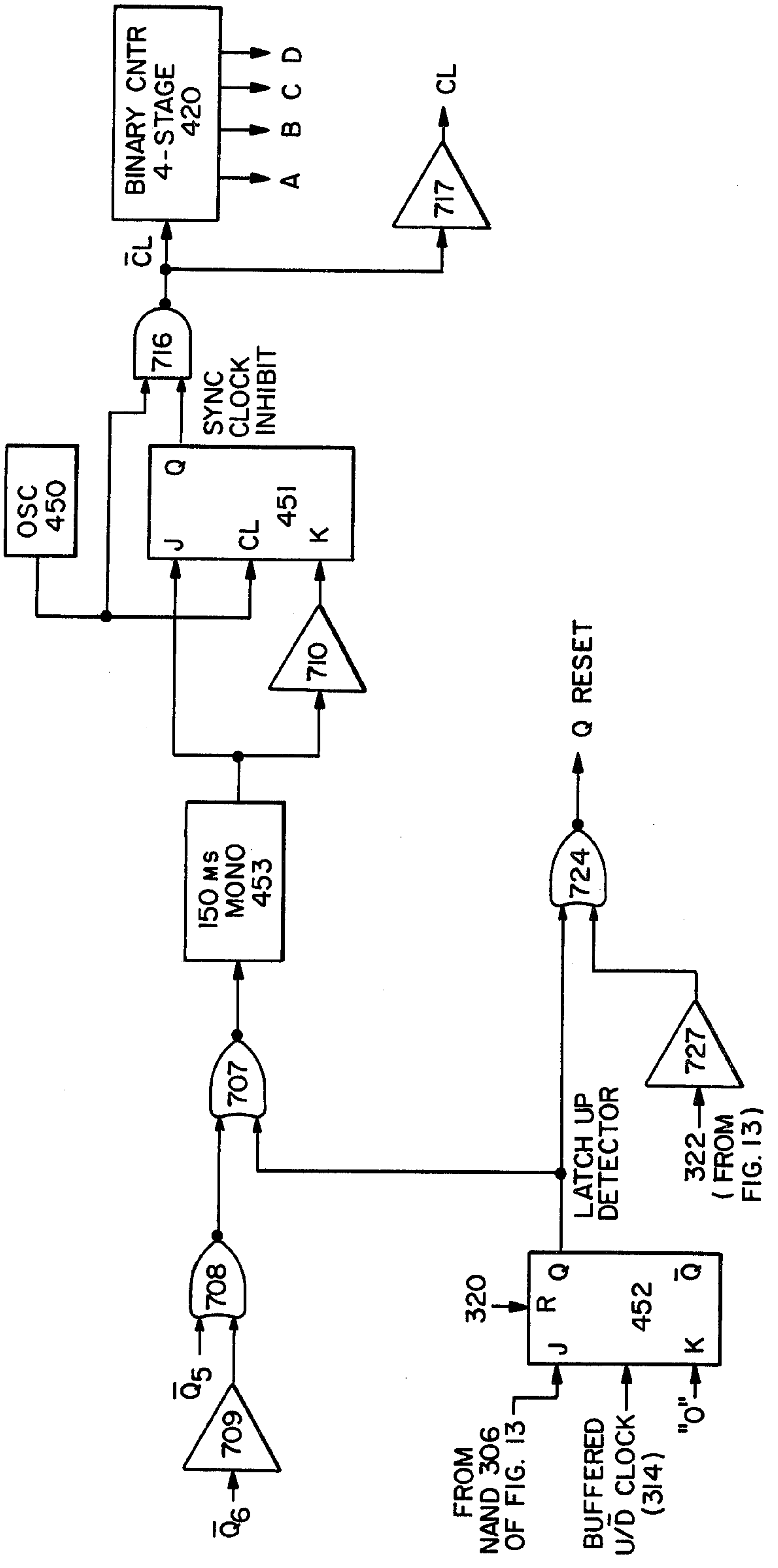
FIG. 20 is a schematic logic diagram of the time base generator stage of the block diagram of FIG. 7.

The time base generator is a combination of oscillator, four-stage binary counter and logic gates (See FIG. 20). The criteria have been used in selecting the circuits pertaining to the time base period for the example of embodiment herein described. The signal is to be periodic and the period of all generated signals is to be equal to sixteen clock pulses or one cycle of the four-stage binary counter.

Figure 9:
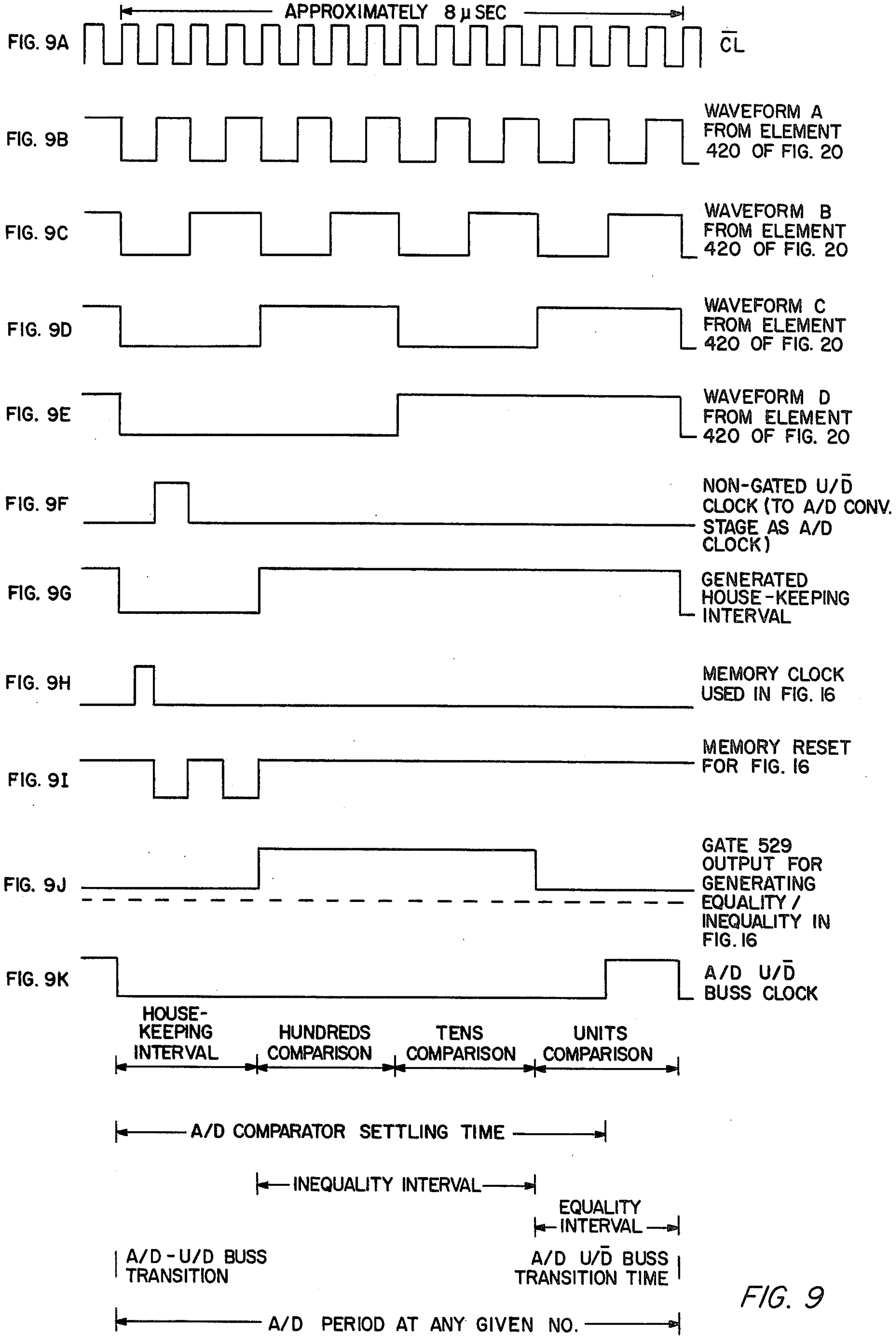
FIGS. 9A–9K represent time signal waveforms associated with the time base generator stage of the block diagram of FIG. 7.

FIG. 9 shows those signals that meet the criteria stated. The timing marks (8 μ Sec.) implies a 2 mHz oscillator. The clock frequency does not affect system accuracy. The clock need only be fast enough to allow the A/D output stage 40 to change as fast as the analog signal is changing. It should be noted that FIG. 9 does not particularly show the inverted signals of that which are illustrated, but which are, nonetheless, generated in the apparatus.

FIG. 9A is a squarewave generated from a conventional Colpitts oscillator. Both the squarewave designated ($\overline{C1}$) and its inverted signal (C1) are generated. $\overline{C1}$ is used to clock a four-stage binary counter 420 (FIG. 20). Outputs A,B,C,D (FIGS. 9B–9E) are the four counter outputs. These outputs change state on the positive $\overline{C1}$ transitions (low to high). The signal waveform depicted in FIG. 9F is used as the A/D converter stage clock and is referred to as the non-gated U/$\overline{D}$ clock. FIG. 9G depicts a signal-generated interval described in FIG. 9 as a housekeeping interval. This interval is used to generate the conditional logic signals which perform residual baseline subtraction, recognize peaks and valleys, and distinguish compression and ejection pulses. These functions are performed by the sequential magnitude comparator 80 and comparison mode control 100.

The waveform of FIG. 9H depicts a signal used as a memory clock in the comparison mode control stage 100, and FIG. 9I shows a signal used as a memory reset in the sequential magnitude comparator stage 80. The waveform of FIG. 9J relates to a generated signal which defines an inequality interval in the sequential magnitude comparator stage 80. This waveform is also inverted and used as an equality interval in the sequential magnitude comparator. FIG. 9K shows the analog to digital converter stage 40 U/$\overline{D}$ buss clock waveform. The U/$\overline{D}$ buss output (from FF46 in FIG. 10) changes on the negative transition (high to low) of this clock signal.

Figure 10:
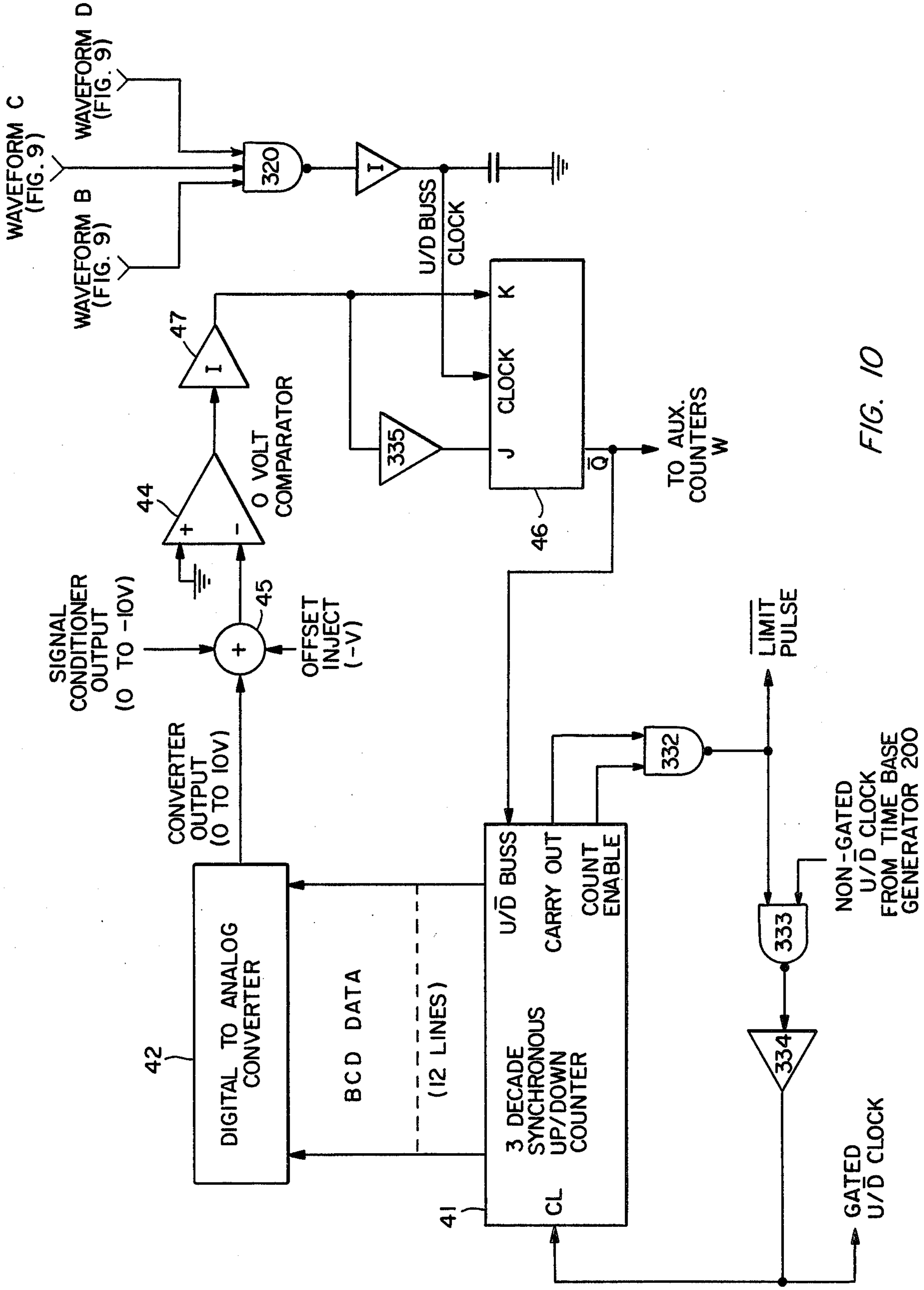
FIG. 10 is a block diagram showing in greater detail the analog-to-digital converter stage of the block diagram of FIG. 7.

The analog to digital converter stage is illustrated in the block diagram of FIG. 10 and comprises: a 12-bit BCD digital to analog converter 42, a fast high-gain comparator 44, a 3-decade up/down synchronous counter 41 and control logic. The digital to analog converter 42 output can vary from 0 to 9.99 volts depending on the count stored in the up/down synchronous counter. The voltage output of the converter 42 changes ten mv for each count entered in the counter 41.

The signal from the signal conditioner stage 20 is summed in element 45 with the output of the d/a converter 42 and an offset voltage. The offset voltage and signal conditioner output signal can be considered one signal that is negative in polarity. The 0-volt comparator 44 provides an output signal indicating which signal is larger in magnitude. The comparator 44 output is used to control the up/down buss input of the three-decade counter arrangement 41. In operation, the decade counters 41 are continuously updated to provide the binary coded decimal output required to make the d/a converter 42 voltage equal to the magnitude of the combined signal conditioner output and bias (offset inject) signal.

Figure 11:
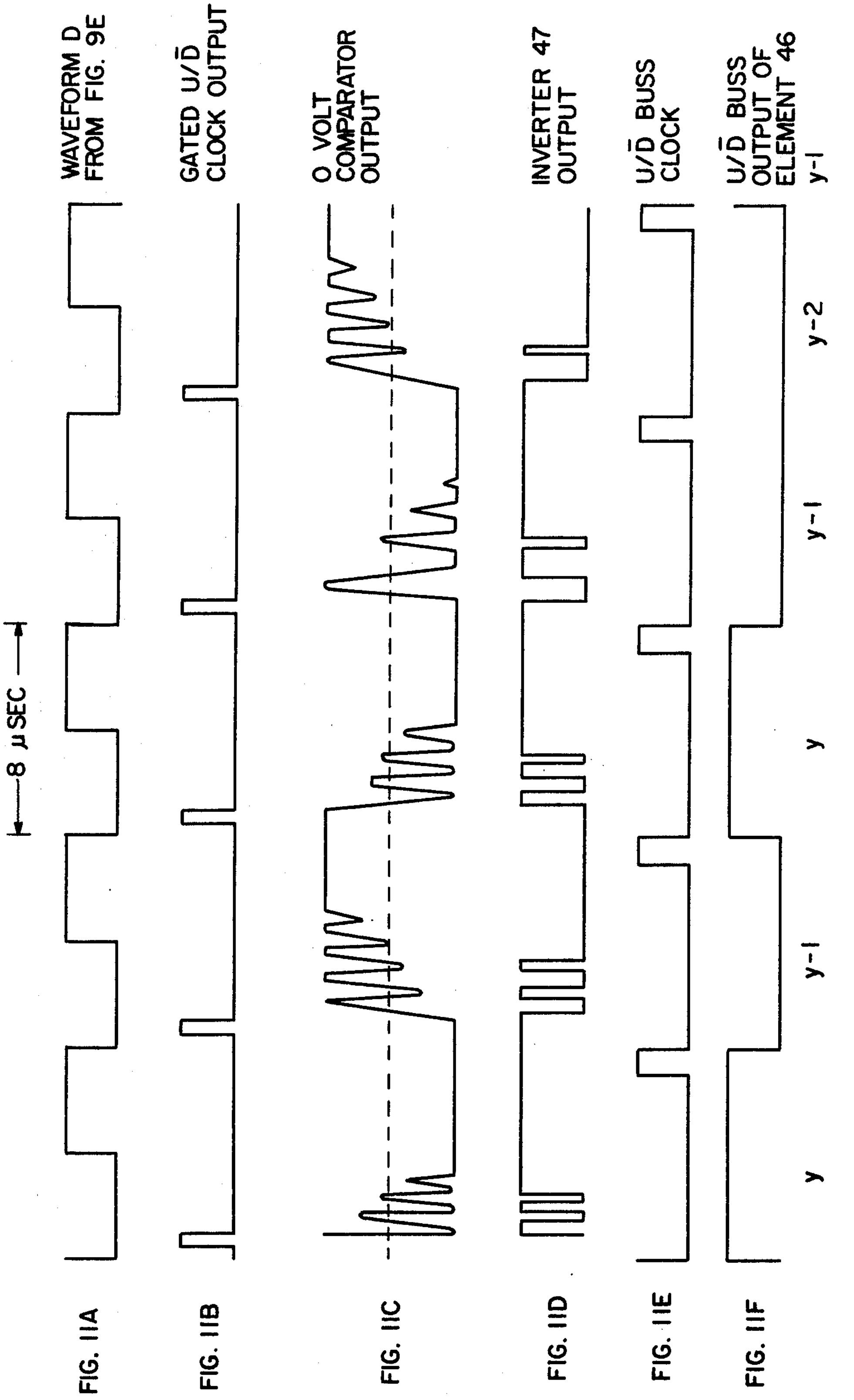
FIGS. 11A–11F illustrate timing waveforms associated with the analog-to-digital converter stage depicted in FIG. 10.

FIG. 11 shows the timing relationships in the A/D stage 40 of the gated U/$\overline{D}$ clock output, 0-volt comparator 44 output, U/$\overline{D}$ buss clock (see FIG. 9K waveform of the timing base generator) and U/$\overline{D}$ buss output of element 46 (FIG. 10). While the counters 41 are synchronous, the up/down buss signal (FIG. 11F) should be synchronized to avoid erroneous counts. If the U/$\overline{D}$ buss were allowed to change while a gated U/$\overline{D}$ clock (FIG. 11B) was going through its negative transition, some decades would count up and some would count down. For this reason the 0-volt detector 44 output signal is applied through inverters to the J and K inputs of flip-flop (FF) 46. The state of the comparator 44 is monitored while the U/$\overline{D}$ buss (FIG. 11E) is in a low logic state. The state of the 0-volt comparator 44, at the positive transition of the U/$\overline{D}$ buss clock, is stored in FF 46 and transferred to the flip flop output, i.e. U/$\overline{D}$ buss (FIG. 11F, also identified as the Q output of FF 46 in FIG. 10) at the negative transition of the U/$\overline{D}$ buss clock pulse. Thus, the U/$\overline{D}$ buss is forced to change in synchronism with the reference waveform D depicted in FIG. 11A (which is the waveform shown in FIG. 9E). This allows time for the internal gates of the counters 41 to settle in the correct state before the negative transition of the gated U/$\overline{D}$ clock pulse.

FIG. 11 shows the U/$\overline{D}$ buss switching in synchronism with the waveform D (also of FIG. 9E). While the U/$\overline{D}$ buss alternates high and low for each cycle of the D waveform, the synchronous counters 41 are varying between some count $y$ and $y-1$. The appearance of two sequential down counts in FIG. 11F indicates the transducer signal voltage has decreased in magnitude, which forces the U/$\overline{D}$ synchronous counters 41 to vary between $y-2$ and $y-1$, or one count less than before.

If the signal conditioner output signal plus offset (bias) voltage were to go more negative than −9.99V or slightly positive, the D/A converter 42 would lose lock. This means the magnitude of the d/a converter output voltage would not be the same as the analog signal.

This condition occurs when the U/$\overline{D}$ counters 41 are at the count 999 and the U/$\overline{D}$ buss input to counters 41 is in the high state. The next count would cause the synchronous counters to change to 000. The d/a converter 42 output would be zero volts within a microsecond or so while the signal conditioner output signal is somewhat greater than −9.99V.

A similar limit condition exists when the counters 41 are at 000 and the U/$\overline{D}$ buss input thereto is in the low state. The next clock pulse would advance the counters to 999 despite the fact that the signal conditioner output is at zero volts or slightly positive.

Figure 12:
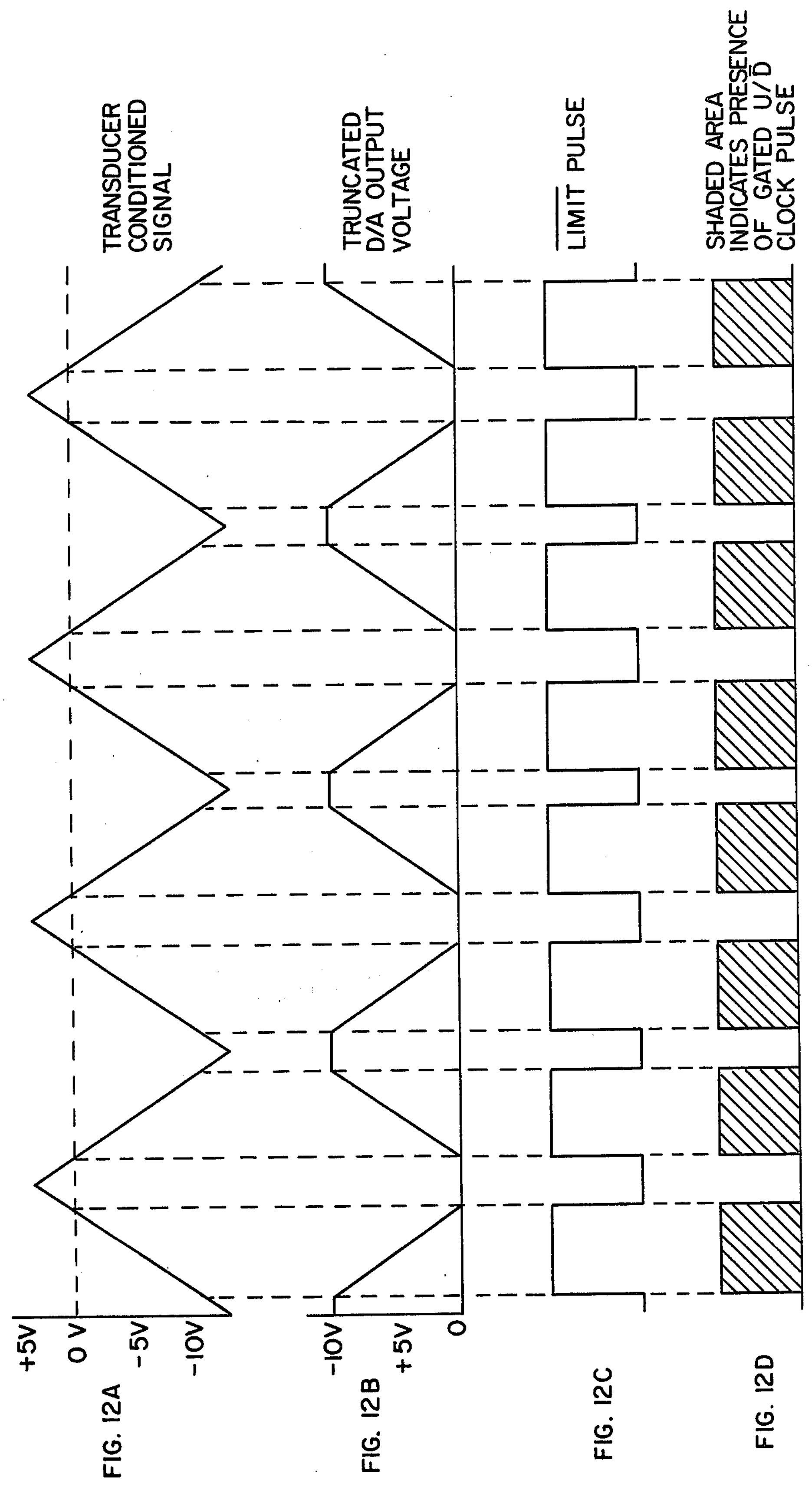
FIGS. 12A–12D are timing waveforms associated with the analog-to-digital converter stage of the block diagram of FIG. 10 regarding transducer signal "out-of-range" situations.

FIG. 12 shows the d/a converter 42 output voltage where the conditioned transducer signal is outside the upper and lower limits of the d/a converter. The d/a converter output voltage is truncated at 9.99V and zero volts by a signal designated the limit pulse shown in FIG. 12C (originating from FIG. 10). Presence of the limit pulse indicates the fact that the counters 41 of the A/D converter stage 40 are 999 and the U/$\overline{D}$ buss input to counters 41 is high (conditions that lead to the synchronous counters 41 generating a carry pulse) and inhibits via gates 332 - 334 the non-gated U/$\overline{D}$ clock pulse from advancing the synchronous counters 41 (see FIG. 10). A simlar situation exists when the synchronous counters 41 are at 000 and the U/$\overline{D}$ buss input thereto is low (synchronous counters generate a borrow). Once again the limit pulse is generated which inhibits the non-gated U/$\overline{D}$ clock pulse from advancing the synchronous counters until the U/$\overline{D}$ buss input thereto goes high. In FIG. 10 gate 332 actually generates the inverted limit pulse. This pulse gate (via gates 333 and 334) the non-gated U/$\overline{D}$ clock and produces the gated U/$\overline{D}$ clock.

Two aspects of the limit detection are that the synchronous counters change by only one count at a time except when the limit pulse is present and, for the synchronous counters to go from a first count to a second count every interger between said first and second counts must have been stored in the synchronous counters 41 for at least one full clock period (waveform E in FIG. 11).

Figure 13:
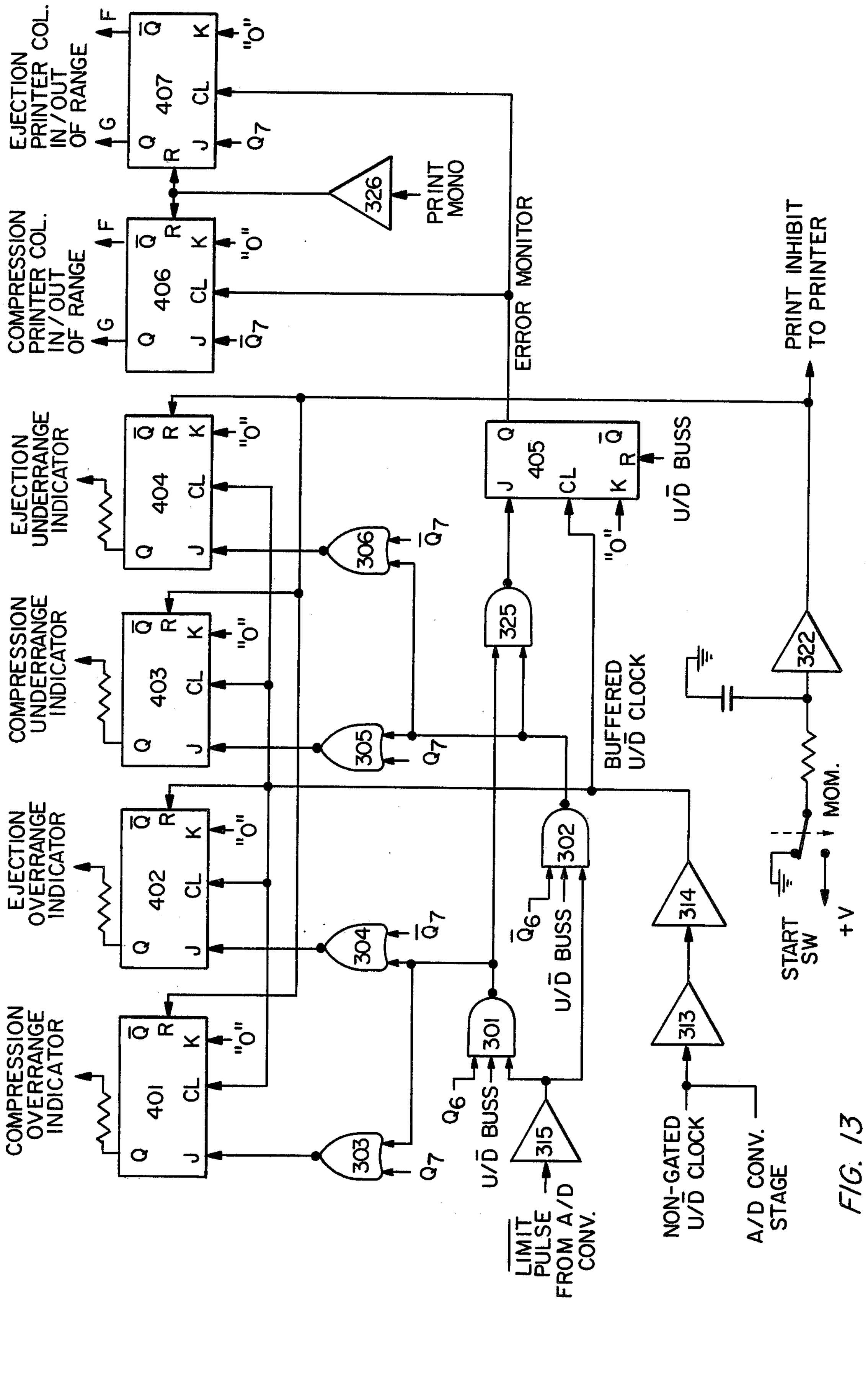
FIG. 13 is a schematic logic diagram of the memory and out-of-range logic stage of the block diagram of FIG. 7.

From the previous discussion it is seen that the limit pulse represents an out-of-range condition. FIG. 13 is a diagram depicting logic which is used to memorize out-of-range conditions and the portion of the transducer cycle in which such occur. This comprises the memory and out-of-range logic stage 170 of main block diagram FIG. 7.

Nand gates 301 and 302 of FIG. 13 divide out-of-range conditions into "out-of-range" during baseline measurement, and during peak measurement, respectively. This allows "out-of-range" to be separated into underrange (during baseline measurement) and overrange (during peak measurement). Nor gates 303 and 305 further monitor only "out-of-range" for the compression cycle while nor gates 304 and 306 monitor only out-of-range conditions during the ejection cycle. The four flip flops 401–404 are used as a memory and also may be used as drivers for four respective out-of-range light indicators. These four memories are reset by an input from inverter 322, which is derived from the start switch.

The printer readout includes two columns, one each for compression and ejection, which are used to print out an appropriate indication if the limit pulse appears in the measurement cycle. That is, if the limit pulse occurs during compression, the F indicator wuld appear in the compression column; likewise for the ejection column readout. In FIG. 13, nand gate 325 is used to detect an overrange or underrange. This information is stored in the error monitor FF405. When the error monitor 405 is reset by the U/D buss clock (FIG. 9K), the information ("out-of-range" has occurred) is transferred into one of two memories, i.e. FF's 406 and 407), depending on the state of $Q_7$ input from the comparison mode control stage 100 indicating whether the logic is in the compression cycle or ejection cycle portion of a tabletting event ($Q_7 = 1$ is ejection, $Q_7 = 0$ is compression). These memories are reset via inverter 326 after the printer has been activated.

Figure 14:
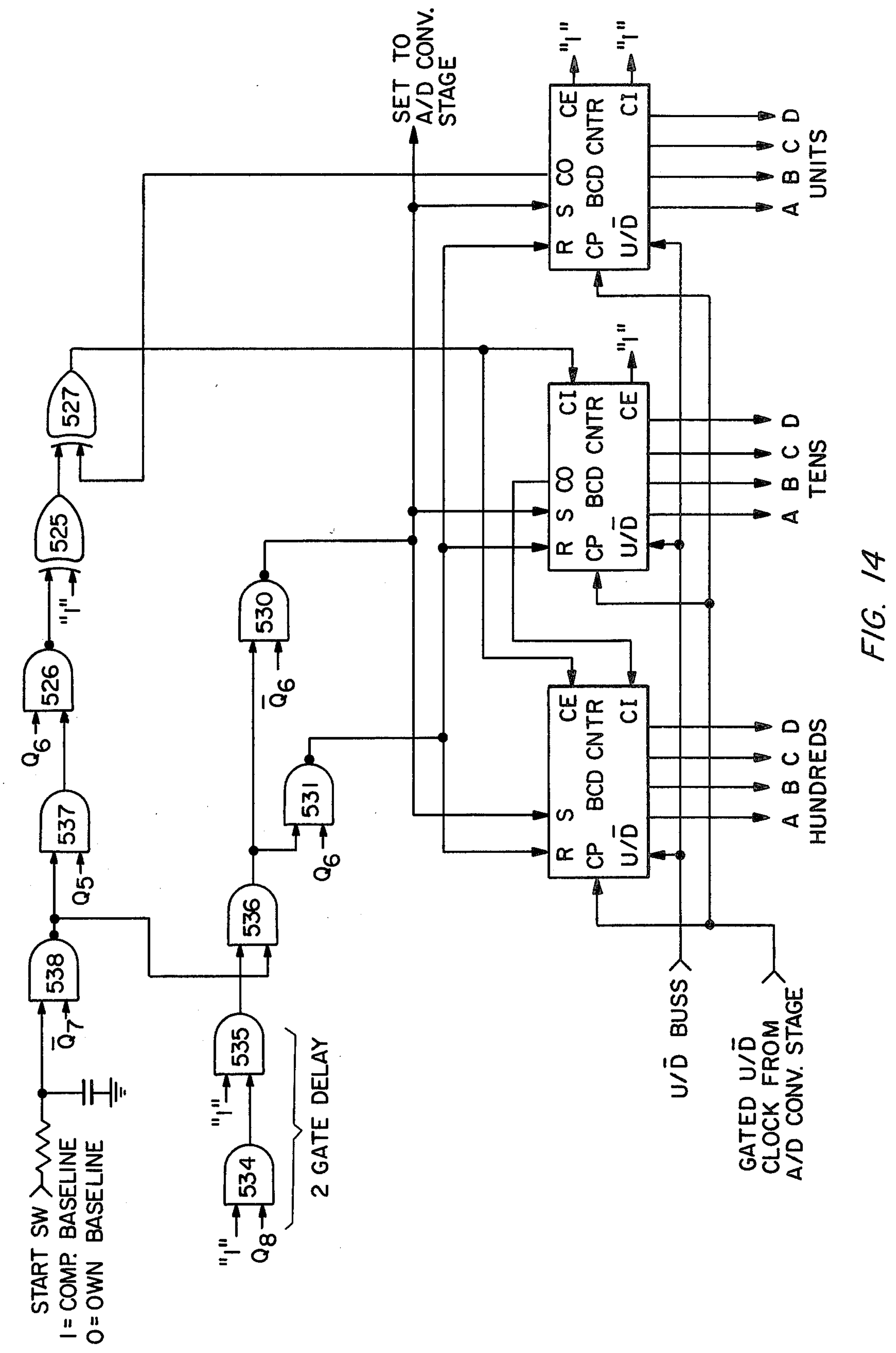
FIG. 14 is a schematic logic diagram depicting the counters W stage of the block diagram of FIG. 7.

FIG. 14 depicts the auxiliary counters W stage 50. These counters 50 are synchronous up/down counters identical to the three-stage U/$\overline{D}$ stage 41 (FIG. 10). These counters share most of the same signals. The auxiliary counters W have the same gated U/$\overline{D}$ clock pulse, U/$\overline{D}$ buss input and set pulse. The auxiliary counters W have the reset facility for baseline subtraction, when required, which the A/D counters 41 do not have. The auxiliary counter BCD outputs lead to the working memory X stage 60 and the parallel-to-serial converter 70 in the system block diagram.

The working memory X stage 60 comprises three latches which provide the ability to store a 12-bit BCD number on command (i.e. a strobe). The comparison mode control stage 100 provides the command (called memory refresh in FIG. 7) when a number is to be stored. Outputs of working memory X are connected to a parallel-to-serial converter 71 and are compared with numbers stored in the auxiliary counters W via the sequential magnitude comparator stage 80. In one complete tabletting cycle, working memory X has stored: the lowest number reached in the compression baseline search interval, the largest number reached in compression peak search interval and the same corresponding values for the ejection cycle.

The parallel-to-serial converters 70 and 71 sequence the auxiliary counters W and working memory X data respectively, the most significant bit (MSB) first. One complete comparison is made in a cycle of the time base generator waveform D (FIG. 9E). Time base generator waveforms A, B, C, D. (FIGS. 9B–9E) determine which bit is being sampled.

The sequential magnitude comparator (FIG. 7) compares the two numbers from auxiliary counters W and working memory X, and indicates which number is larger.

To tell which of the two numbers is larger, sequential magnitude comparator (SMC) stage 80 looks at the most significant digit (MSD) of both numbers. If the numbers are different, it is automatically known which is larger without looking at any other digits. If they are the same the procedure is followed on the next most significant digit, until the SMC stage 80 finds two digits which are different or runs out of digits to compare.

Instead of comparing decimal numbers the sequential magnitude comparator compares binary numbers. The specific binary code used in the comparison is called binary coded decimal. There are four bits or comparisons to be made for each decimal digit. If the most significant bits are the same, the next bit is compared. The comparison is finished as soon as the two bits being compared are different. All the less significant bits are ignored.

Figure 15:
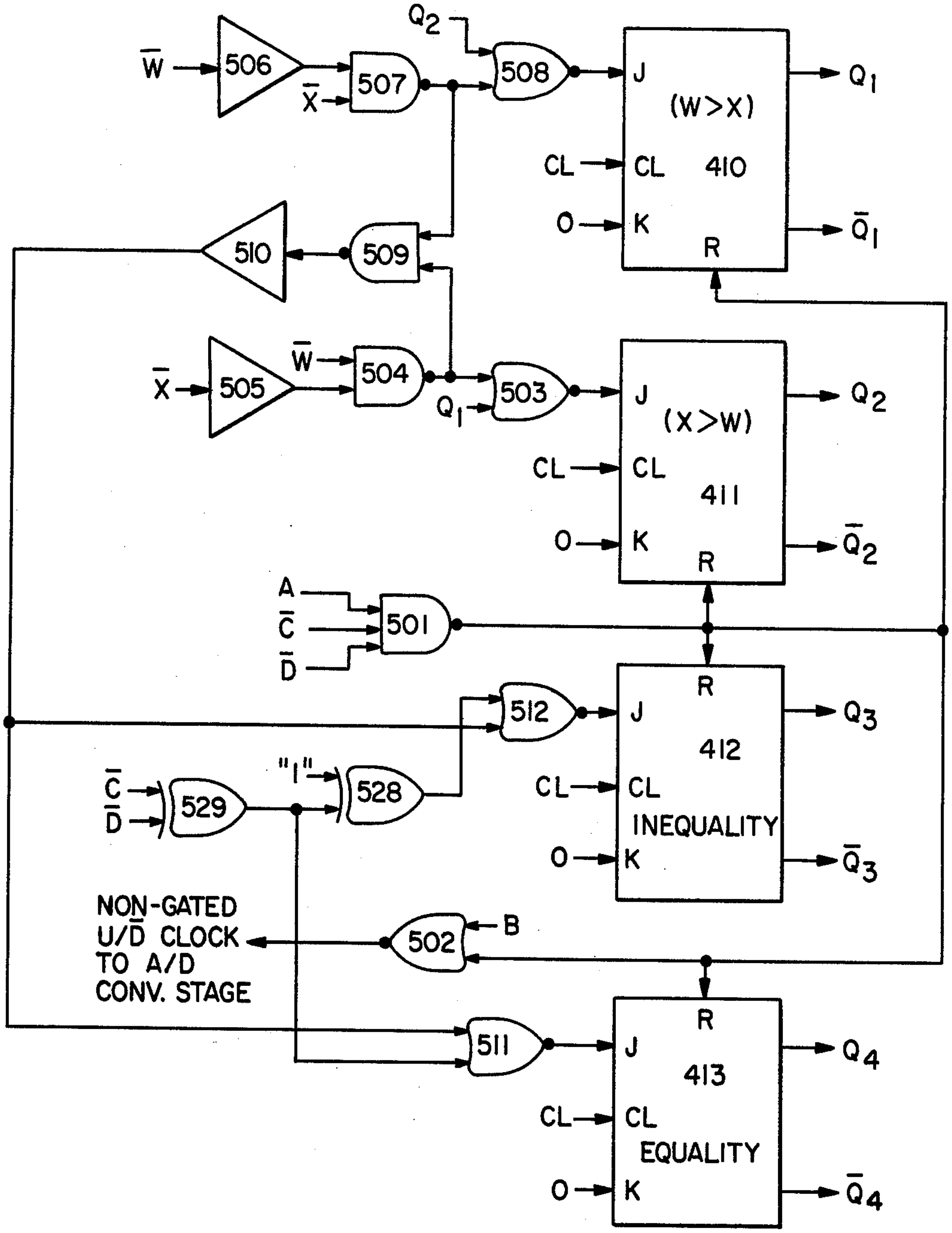
FIG. 15 is a schematic logic diagram of the sequential magnitude comparator stage of the block diagram of FIG. 7.

The sequential magnitude comparator 80 is illustrated in detail in FIG. 15. The principle gates and memories (FF's) under discussion are: $Q_1$ and $Q_2$. Nor gates 503 and 508, inverters 505 and 506, Nand gates 504 and 507.

Element 410 ($Q_1$, $\overline{Q}_1$ output) is the memory used to indicate that the auxiliary counters W contain a number larger than the number stored in working memory X. By a truth table one can indicate that the logic allows the $Q_1$ output of FF410 to be triggered only if $W > X$.

The condition of $W = 1$, $X = 0$ and $Q_2 = 0$ (no decision on $X > W$ has occurred) is the only case where Nor gate 508 goes high. This allows FF 410 output $Q_1$ to trigger high. If FF 411 output $Q_2 = 1$, no combination of W and X allows Nor gate 508 to go high and therefore allow the FF 410 output $Q_1$ to trigger. $Q_2$ being high is equivalent to the condition that $X > W$, as the truth table would show.

Such a truth table would indicate further that Nor gate 503 goes high only when $Q_1 = 0$ from FF 410 (no decision concerning $W > X$), $W = 0$ and $X = 1$. $Q_2$ therefore gives the indication when $X > W$. Once either $Q_1$ or $Q_2$ goes high, the comparison is complete and no combination of X and W will alter either $Q_1$ or $Q_2$.

If both $Q_1$ and $Q_2$ are zero after the comparison, the two numbers compared are the same since a difference in any bit would trigger $Q_1$ or $Q_2$. The case $Q_1$ and $Q_2$ both high cannot happen since as one goes high it stops the other memory from toggling.

The clock used as the trigger is the 2MHZ clock discussed in relation to the time generator 200 stage. In the example case depicted herein, the clock period is 0.5 microseconds, so one digit is compared in 2 $\mu$ sec. Comparison reset is provided as shown in FIG. 15 by the Nand gate 501 having the A, $\overline{C}$ and $\overline{D}$ waveforms from FIG. 9 fed thereto, wherein gate 501 is in turn coupled to the reset of FF's 410 and 411. It is also coupled to a Nor gate 502 along with the B waveform of FIG. 9C, to provide as an output the non-gated U/$\overline{D}$ clock source which is in turn fed to the A/D converter stage 40 (FIG. 10).

As to the comparison cycle being performed by the SMC 80, in the example situation depicted herein, it takes 16 clock pulses at 2 MHZ each to complete one full comparison cycle. The four-stage binary counter 420 in the time base generator stage 200 provides the outputs A, B, C, D illustrated in FIGS. 9B-9E (and Table I below which uniquely determine the timing position of each period of the comparison cycle. Table I designates the sixteen different periods and indicates their relationship to the time base generator outputs, A, B, C, D.

Table I also specifies the function performed in each comparison period.

TABLE I

| Period | Time Base Gen | Bit No Compared | $Q_1$ or $Q_2$ Activated by Bit No. | Aux. W. Clock Pulse | | |
|---|---|---|---|---|---|---|
| NO. | A B C D | | | | | |
| 0 | 0 0 0 0 | Bogus 1 | 12 | none | House-keeping | |
| 1 | 1 0 0 0 | Bogus 1 | reset | clock pulse | | |
| 2 | 0 1 0 0 | Bogus 1 | none | — | | |
| 3 | 1 1 0 0 | Bogus 1 | reset | — | | |
| 4 | 0 0 1 0 | MSB 1 | none | — | 100's Comparison | Inequality Interval |
| 5 | 1 0 1 0 | 2 | 1 | — | | |
| 6 | 1 1 1 0 | 3 | 2 | — | | |
| 7 | 1 1 1 0 | 4 | 3 | — | | |
| 8 | 0 0 0 1 | 5 | 4 | — | 10's Comparison | |
| 9 | 1 0 0 1 | 6 | 5 | — | | |
| 10 | 1 1 0 1 | 7 | 6 | — | | |
| 11 | 1 1 0 1 | 8 | 7 | — | | |
| 12 | 1 0 1 1 | 9 | 8 | — | Unit's Comparison | Equality Interval |
| 13 | 1 0 1 1 | 10 | 9 | — | | |
| 14 | 0 1 1 1 | 11 | 10 | — | | |
| 15 | 1 1 1 1 | 12 | 11 | — | | |

The period number is the decimal equivalent of the binary bits A, B, C and D. As discussed in reference to the parallel-to-serial converters 70, 71 and the sequential magnitude comparator 80, the two numbers stored in counters W and memory X are compared, the most significant bit first. Table I shows the periods 0 to 3 inclusive compare bogus 1's. Since both numbers are always the same, periods 0 - 3 inclusive never trigger either $Q_1$ or $Q_2$ of the sequential magnitude comparator 80.

These four periods are used to perform the conditional logic functions, resulting from the previous comparison cycle, as required by the states of the remaining logic of the SMC 80 and CMC 100 stages following said previous comparison. The specifics of periods 0 - 3 are discussed in relation to the comparison mode control hereinafter.

Periods 4 to 7 inclusive are reserved for the comparison of the hundreds digit which is designated as MSB 1 to 4. The $Q_1$ and $Q_2$ outputs are delayed one period as shown by the column identified as "$Q_1$ or $Q_2$ Activated by Bit No.". An inequality in MSB 1 occurring in real time period 4, causes either $Q_1$ or $Q_2$ to trigger in period 5. The gated U/$\overline{D}$ clock pulse is shown to illustrate that, while the 12 bits are being compared, no counts are entering the U/$\overline{D}$ counters W or the A/D counters 41.

Periods 8 to 11 inclusive compare the tens digit of the two numbers in a similar manner to the hundreds digit.

Periods 12 to 15 inclusive compare the units digits of the two numbers. As the cycle starts over again, the previous comparison (state of $Q_1$ and $Q_2$) in conjunction with the remaining logic of the SMC 80 and CMC 100 stages (hereinafter referred to as $Q_3$ to $Q_8$) cause to be stored in working memory X, the proper number.

Figure 16:
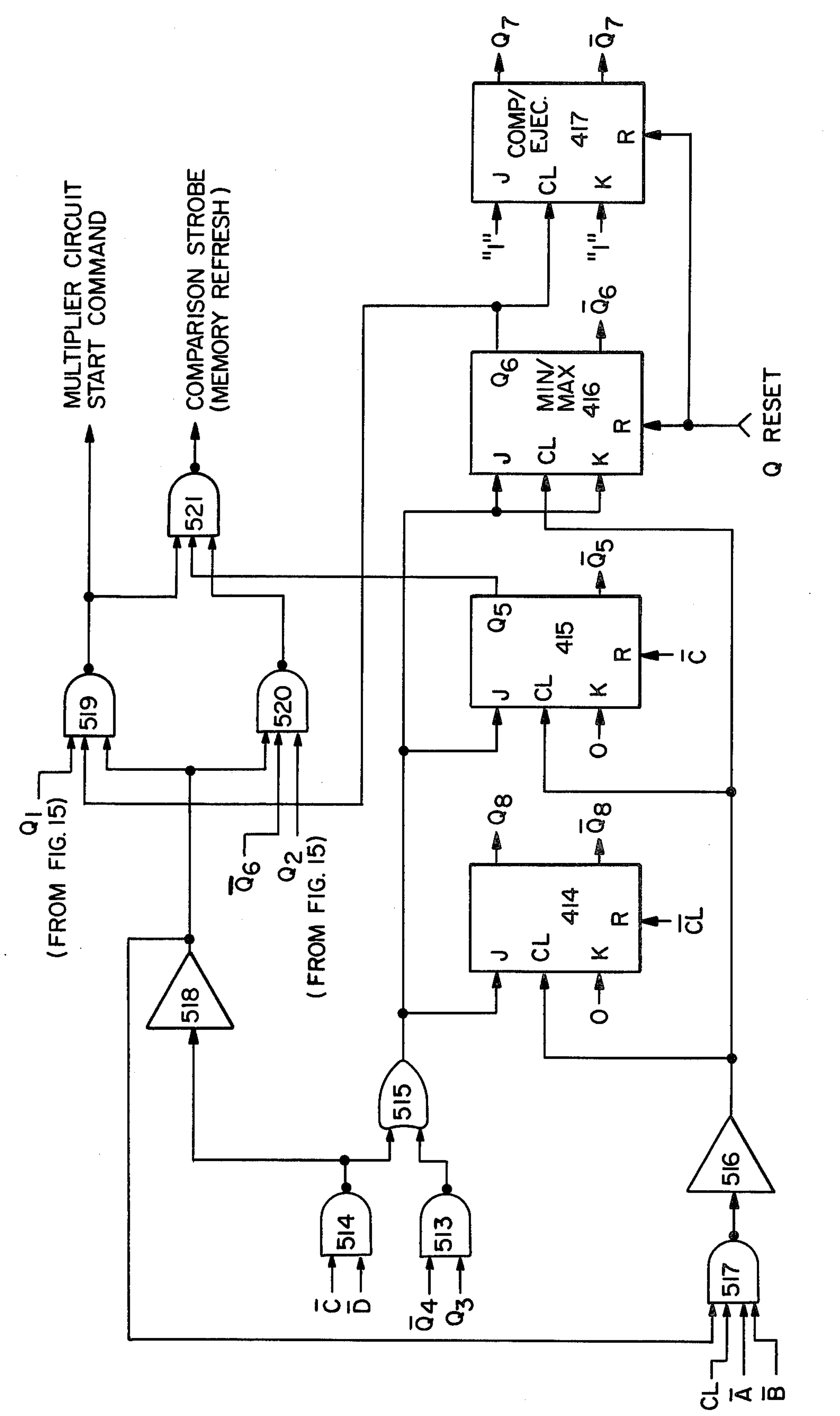
FIG. 16 is a schematic logic diagram of the comparison mode control stage of the block diagram of FIG. 7.

If working memory X were strobed each time $Q_1 = 1$ (i.e. $W > X$), the number stored in memory W would be the maximum number counters W ever reach. If memory W were strobed (memory refresh pulses) every time $Q_2 = 1$ (i.e. $X > W$), then the number stored in memory X would be the minimum number counters W ever reached. Nand gates 519 and 520 of FIG. 16, and more specifically the $Q_6$ and $\overline{Q6}$ inputs thereto from Min/Max FF 416 of CMC stage 100, determine if $W > X$ (minimum W) is stored. The $Q_6$ memory i.e. the Min./Max FF 416, therefore, determines what part of the compression or ejection cycle the logic is in. The criteria and method of changing the logic cycle is discussed in the following paragraphs.

If $Q_6 = 0$, $Q_2$ controls Nand gate 520, and every time $Q_2 = 1$ ($X > W$), the X memory is strobed. This means that $Q_2$ will cause the smallest number in counters W to be stored in the X memory. If however the number in counters W begins to increase, $Q_2$ will not trigger and the difference between W and X increases. When the difference between W and X is ten counts the criteria for a logic change is met. The logic switches to a search for maximum W and the Nand gate 519 causes only $W > X$ to be strobed into the X memory.

$Q_6 = 1$ in Min./Max memory 416 causes this change in logic by disqualifying Nand gate 520 and qualifying Nand gate 519. It is now $Q_1$ which determines whether a strobe (i.e. memory refresh pulse) is generated.

Logic elements 509-512, 528-529 and FF memories 412 and 413 (having respective outputs $Q_3$ and $Q_4$) in FIG. 15 determine when a search for baseline is completed and a search for a peak should be implemented.

Nand gate 509 goes high only when a bit being compared is unequal. Inverter 510 changes the high to a low. Gate 512 will activate the $Q_3$ FF only during periods 4 to 11 inclusive (Table I) due to the exclusive OR gate 528 input. Therefore, $Q_3$ will toggle only during the units comparison (periods 12 to 15 inclusive of Table I) due to exclusive OR gage 529. $Q_3 = 1$ and $Q_4 = 0$ is the condition that $|W\text{-}X| = 10$.

Nand 513 (FIG. 16) provides a low ($Q_4 = 0$, $Q_3 = 1$) during the housekeeping interval (periods 0–3 inclusive) and FF memory elements 414 - 418 of the CMC stage 100, having respective outputs $Q_5$, $Q_6$, $Q_7$ and $Q_8$, are triggered.

The $Q_6$ FF or memory, as mentioned previously, determines whether a maximum or minimum number is stored in memory X. The $Q_7$ FF or memory determines whether the numbers being stored are compression ($Q_7 = 0$) or ejection ($Q_7 = 1$) values. The $Q_8$ FF or memory is used to reset and set the auxiliary counters W to eliminate the undesired ejection baseline. The $Q_5$ FF or memory is used to insert a starting count of ten in the auxiliary counters W. As indicated, $Q_5$ through $Q_8$ form the comparison mode control block of the system block diagram of FIG. 7.

Figure 17:
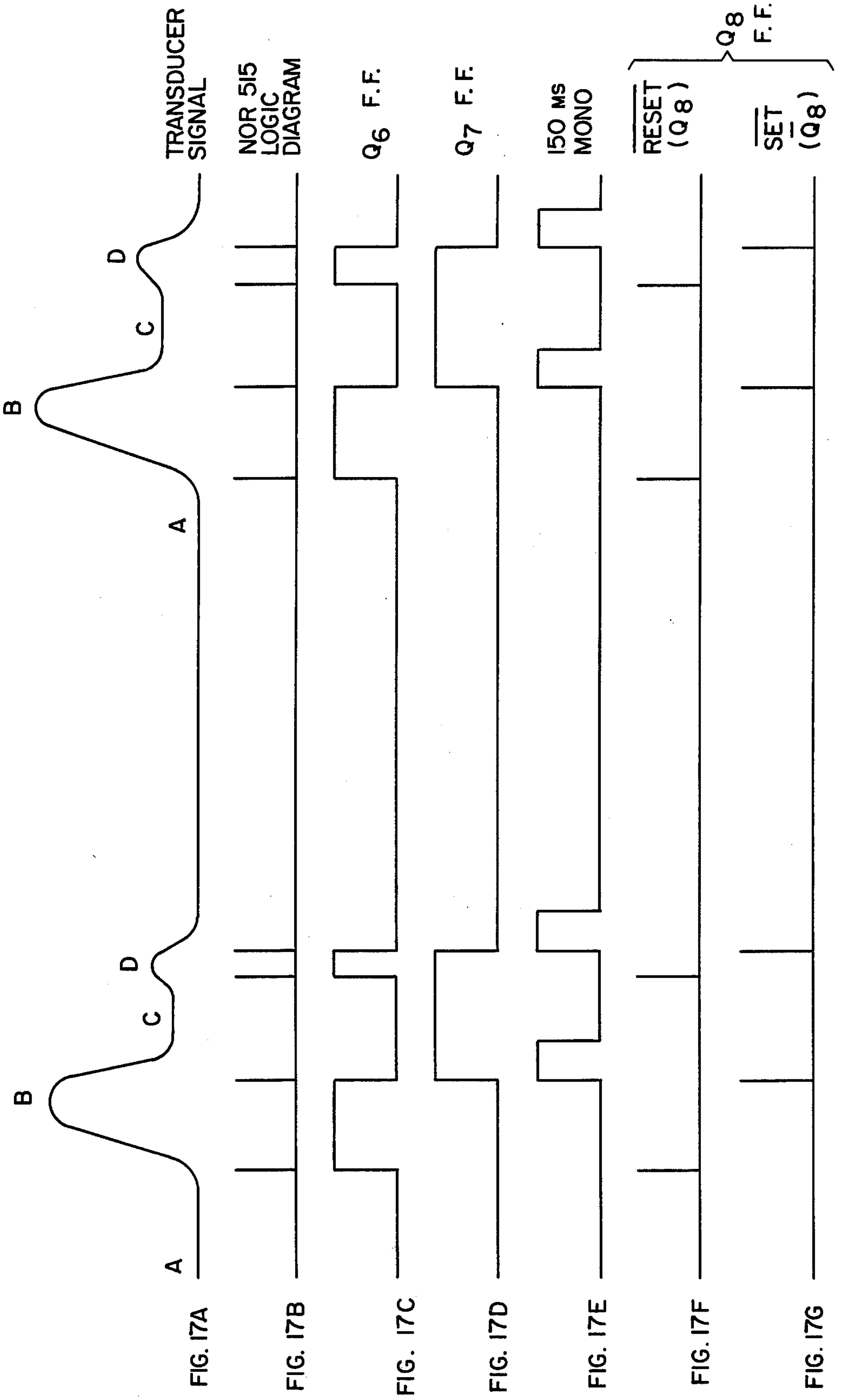
FIGS. 17A–17G constitute a timing diagram illustrating the apparatus according to the invention operating in the function switch II mode, in which the compression and ejection peaks are measured relative to their own baseline.

FIG. 17 is a timing diagram showing the various stages of $Q_8$, $Q_5$, $Q_7$, $Q_6$ during the two substantially completed tabletting cycles of transducer signal (FIG. 17A). These timing signals occur when the function switch is in the position II, i.e. the apparatus is set to search for the peak values of $|BA|$, $|DC|$. In this mode, the peaks are measured with respect to their own baseline.

The portion of the timing diagram of FIG. 17 where $Q_6$ and $Q_7$ are low, is the compression baseline search mode. Working memory X at this point is storing the lowest measured value, as taken from counters W.

Just before the Nor gate 515 spike, the signal starts increasing. The number read into the auxiliary counters W also increases, but the number stored in the working memory X is still the smallest number recorded. When the auxiliary counters W arrive at ten counts above the working memory X, $Q_3$ and $Q_4$ (FIG. 16) trigger $Q_5$, $Q_8$ and $Q_6$.

$Q_8$ is used to reset the auxiliary counters W, thereby eliminating the compression baseline stored therein. $Q_5$ is used to restore the ten counts belonging to the signal peak (in this case the compression peak) lost in the reset process.

Since $Q_6 = 1$ at this point, $Q_1$ controls the strobe (FIG. 16) for the working memory X, and only auxiliary counter W numbers which are the larger than the working memory X are stored in memory X. All during this measurement, the auxiliary counters W differ from the number in the A/D counters 41 by exactly the previously measured compression baseline.

As the signal starts to decrease following a peak in the transducer input signal during the compression cycle, the working memory X retains the largest number. The difference between the auxiliary counters W and working memory X increases until the difference between them is again ten counts.

At this point $Q_6$ is triggered low and the system (memory X) will store minimum numbers. $Q_7$ at this time is triggered high indicating that the compression measurement is complete and the ejection measurement has begun. $\overline{Q8}$ at this time sets both the auxiliary counters W and the A/D counters 41. $Q_5$ causes the set count 999, now found in counters W to be stored in the working memory X. The A/D counters 41 now count until the signal voltage from signal conditioner stage 20 is equal to the output voltage of digital-to-analog converter 42. Since these counts are all "down" counts, the number in the auxiliary counters W decreases and each decreasing number is stored in working memory X.

After each peak (i.e. compression and ejection) has been measured, a gain change command (i.e. from X1 to X10 or vice-versa in Sig. conditioner stage 20) causes transients to occur in the signal conditioner. A synchronous stop-start command stops the clock CL from the time base generator 200 (FIG. 7) to the sequential magnitude comparator 80 and comparison mode control 100 stages. This eliminates the possibility of the Logic Circuits detecting transients caused by internally generated commands.

Figure 18:
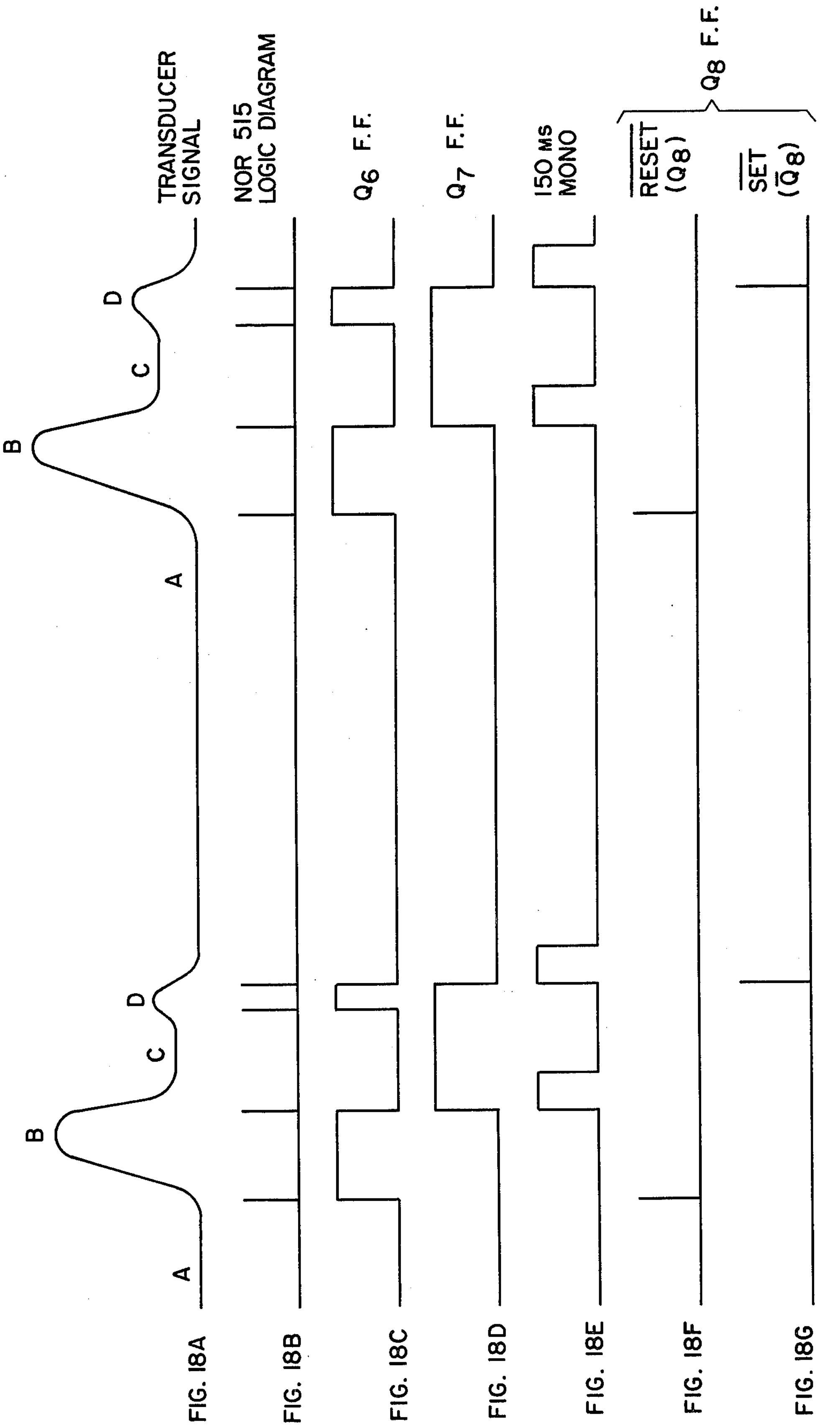
FIGS. 18A–18G constitute a timing diagram illustrating the apparatus according to the invention operating in the function switch I mode, in which both compression and ejection peaks are measured relative to the zero force baseline A.

FIG. 18 is a timing diagram similar to FIG. 17. In this case, however, the function switch has been changed to position I, i.e. the $|BA|$, $|DA|$ position. The differences between FIG. 18 and FIG. 17 lie in the set and reset pulses as provided by $Q_8$. In this mode of operation, a reset pulse to counters W occurs at the start of the compression pulse, as before with FIG. 17. This, again eliminates the measured compression baseline in counters W.

The measurement process then continues as described above, as the compression peak is detected. At this point, however, (i.e. counters W decreasing to ten counts below memory X) the set pulse (of FIG. 17) has been eliminated, thereby continuing the comparison with respect to the compression baseline, i.e. baseline A. As the ejection pulse appears, the reset occurring at this time (in FIG. 17) has also been eliminated and the ejection peak is then measured with respect to the compression baseline A.

After the ejection peak has been detected (i.e. the 10-count difference between X and W), the A/D stage counters 41 and auxiliary counters W are set by a set pulse from the $Q_8$ FF. Once again, both counters contain the same number and the apparatus is ready for the compression baseline measurement of the next tabletting cycle.

The third position, i.e. Position III, on the function switch performs essentially the same measurement as described above, i.e. $|BA|$, $|DA|$. If the ejection peak is less than ten counts, above the ejection baseline, the example arrangement of the invention depicted herein may not recognize the peak.

Position III on the function switch enables the equipment to recognize ejection peaks approximately five counts above the ejection baseline. This is accomplished by injecting an artificial pulse (via dip switch 26 in FIG. 8) which is recorded as a lower ejection baseline (approximately five counts lower) than is actually occurring. The unit then measures ejection peaks ten counts above this artificially reduced baseline. Since the ejection peak is measured with respect to the compression baseline, these five counts in no way alter the accuracy of the instrument or change the ejection peak reading.

Apparatus according to the invention has the feature of reading out directly in units of force. A wide scale factor range allows its use with different transducers. The multiplier circuit provides this flexibility which is coupled to the output of memory X. It should be noted that the scale factor is also to be entered into the calculating means used in the calculation of average and standard derivations for compression and ejection peak forces, since the output of memory X is fed, as well, directly to the parallel-to-serial converter stage 130 leading to the calculating means.

Figure 19:
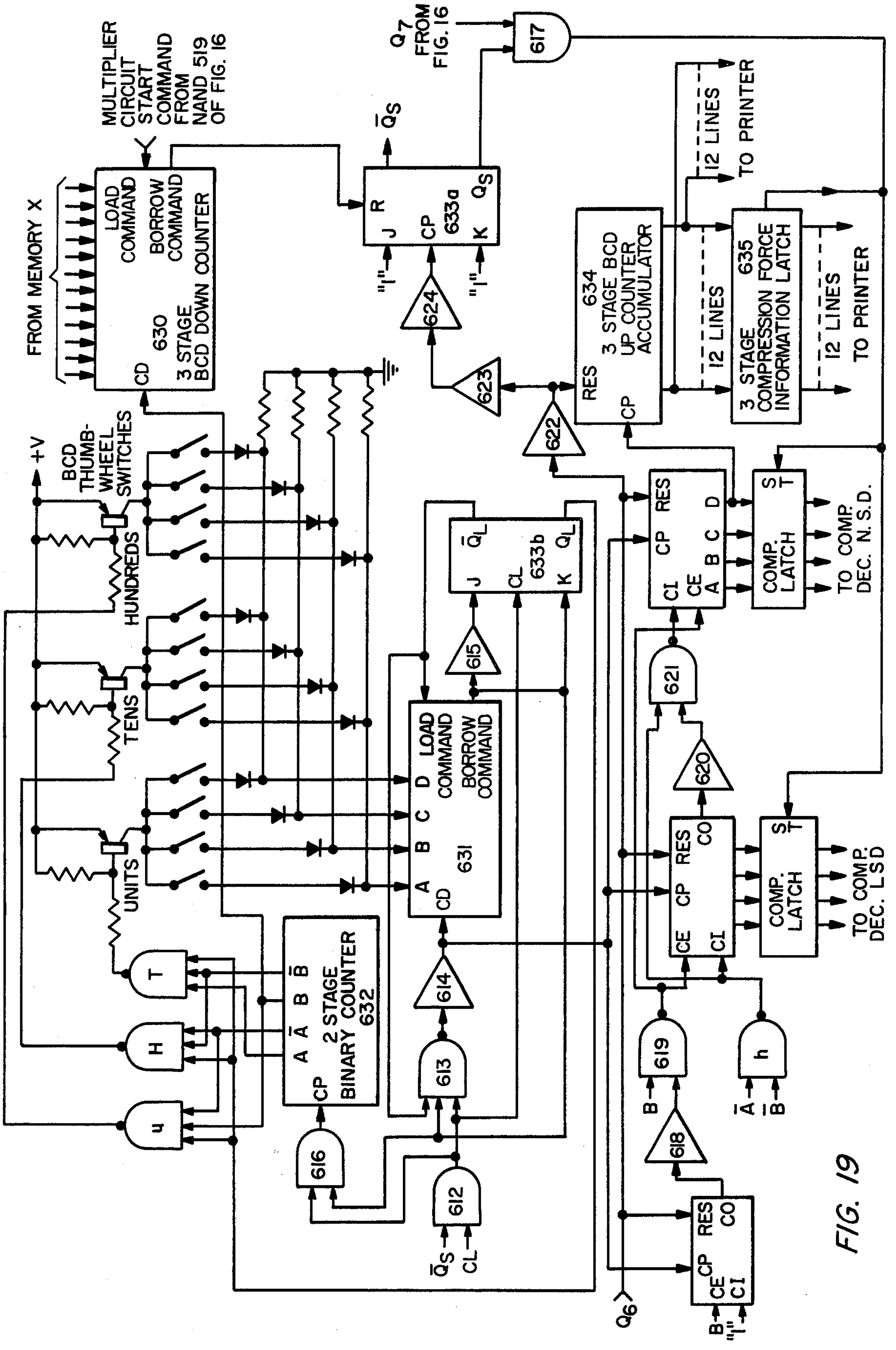
FIG. 19 is a schemtic logic diagram of the multiplier circuit stage of the block diagram of FIG. 7.

FIG. 19 is the logic diagram for the multiplier circuit 120. This circuit comprises a three-stage presettable counter, load memory, start-stop memory, accumulator memory and a program sequencer.

Operation of the multiplier state is as follows. The number to be multiplied is stored in the three-stage down counter 630. When a start command occurs, i.e. arrives from the CMC stage 100, the hundreds column on the thumbwheel switch is loaded into a one-stage counter 631. The down counter 631 counts to zero. As this is happening, the down counter 631 clock pulses are entered in the hundreds column of the accumulator 634. When the down counter 631 is at zero, a load command presets the number on the tens column of the thumbwheel switch into the down counter 631. As the down counter 631 counts to zero, the clock pulses enter the tens column of the accumulator 634. The units are then read into the down counter 631 and the clock pulses enter the units decade of the accumulator 634. The next clock pulse to the two-stage binary counter 632 enters zero in the down counter 631 and completes one full cycle of the programmer. One full cycle of the down counter 631 causes one count to be counted out of the three-stage down counter 630. This sequence is followed until the three-stage down counter 630 counts to zero. The borrow command from the counter 630 stops the accumulation process.

The program sequencer is needed because the multiplication must be done relatively fast. To enter all the counts into the accumulator through the units decade would require a worst case time of approximately 0.5 sec.

The three-stage down counter 630 is connected to the working memory X. The output of Nand gate 519 (FIG. 16) is used to load the counter 630. At a $Q_6$ negative transition (a peak has been confirmed and measured), the start memory or FF 633*a* having output $Q_s$ initiates the multiplication. Counts are then entered in the accumulator 634 as described above. The borrow command from the three-stage down counter 630 (FIG. 19) indicates the accumulation process is complete and resets the start memory 633*a*, terminating the multiplication. AND gate 617 (FIG. 19) causes to be stored the results of the compression peak multiplication in a series of latches 635 used as a memory for the printer readout A. $Q_6 = 1$ signal from the CMC stage 100 resets the accumulator counters 634 and the negative transition of $Q_6$ removes the reset from the accumulator memory 634 and initiates the next multiplication. The information resulting from the ejection peak multiplication, which is performed in the same manner as described above, remains in the accumulator 634 (and is used as a parallel readout for the printer) until $Q_6$ again goes positive (the next compression peak is occurring), which resets the accumulator 634.

Reference is made to the P/S converter stage 130 of FIG. 7. The information to be sequenced is obtained from working memory X (or may also be obtained from the three-stage multiplier down counter) and is loaded into a shift register. On an internally generated command the information is sequenced, and a reading of the compression and ejection peak into the average and standard deviation calculating means (not particularly shown, but, which as aforesaid, may be any suitable calculating circuitry capable of performing average and standard deviation functions) begins.

Time base generator waveform D serves as the parallel load clock source. Buffered $Q_7$ signal allows read-in only during the ejection portion of the cycle, while the multiplier start command (buffered $Q_6$) allows a parallel read-in only during the search for peak mode. As a result the maximum number reached during the ejection cycle is the last parallel entry into the shift register.

To assure only correct data enters the average and standard deviation computing means, for the sequential readout thereto are provided. If an underrange or overrange occurs during the compression or ejection cycles, the sequencer is inhibited. When the start sw is pressed certain logic elements (F's) are set to zero, which include an inhibit. After the start switch is pressed and the first tablet has been measured, the internal print command toggles this logic to remove the inhibit. Consequentially the first tablet is not read into the calculators. The reason for this is the electronics package may be actuated other than at the commencement of a tabletting event, which could lead to erroneous information entering the calculating circuitry.

We claim:

1. Apparatus for use in the development of tabletted granulations comprising:

first means mounted on a tablet press for sensing the forces effected in the tabletting of a granulation and for generating therefrom an analog signal containing compression force and ejection force peak information;

second means connected to said first means for converting said analog signal to a digital representation thereof; and third means responsive to said second means for automatically distinguishing compression force from ejection force for any one or more tablet formations and for individually deriving in digital form peak compression force and ejection force for each such tablet formation.

2. Apparatus according to claim 1 wherein said third means includes fourth means for deriving said digitalized compression force and ejection force information for each tablet formation in desired units of force.

3. Apparatus according to claim 2 further including calculating means, and fifth means connected to said third means and interfacing with said calculating means for effecting and controlling the calculation of the average and standard deviation for both compression force and ejection force from the digital compression force and ejection force information derived from a chosen number of successive tablet formations.

4. Apparatus according to claim 3 further including sixth means connected to said second means and to said fifth means for determining for each tablet formation whether the compression force or ejection force is outside of a predetermined range and, in response to the determination of an out-of-range condition by said sixth means, inhibiting the digitalized compression force and ejection force information from being received by the calculating means.

5. Apparatus according to claim 2 further including means connected to said fourth means for displaying and recording the digital compression force and ejection force information for each tablet formation.

6. Apparatus according to claim 5 wherein said displaying and recording means includes means for generating from said digital compression force and ejection force information at least one ejection profile in graphical form.

7. Apparatus according to claim 1 including means for rendering the derived ejection force information in digital form relative to one of a plurality of selectable different reference levels.

8. Apparatus according to claim 1 wherein said third means includes means for determining from said digital representation of said analog signal for each tablet information the existence of a force peak and whether said force peak is a compression force peak or an ejection force peak.

9. Apparatus according to claim 8 wherein said third means further includes means connected to said second means and said force peak determining means for counting the output of said second means under the control of said force peak determining means and providing an output representative thereof; and means connected to said counting means and to said force peak determining means for storing the output from said counting means and periodically updating said information under the control of said force peak determining means.

10. Apparatus according to claim 9 wherein said third means further includes means connected to said counting means, said storing means and said force peak determining means for periodically determining (1) whether the digital information in said counting means is greater than the digital information in said storing means, (2) for determining whether the digital information in said storing means is greater than the digital information in said counting means and (3) for determining whenever the absolute value of the difference between the digital information in said counting and storing means equals a predetermined number, and for forwarding the information under (1)-(3) to said force peak determining means.

11. Apparatus according to claim 10 further including calculating means, and fourth means responsive to said third means for deriving said digitalized compression force and ejection force information for each tablet formation in desired units of force and fifth means connected to said third means and interfacing with said calculating means for effecting the calculation of the average and standard deviation for both compression force and ejection force from the digital compression force and ejection force information derived from a chosen number of successive tablet formations, and wherein said storing means includes means for reading-out the information stored therein to said fourth means and to said fifth means under the control of said force peak determining means.

12. Apparatus according to claim 10 wherein the tablet formation process includes a compression process portion and an ejection process portion, and further including signal conditioning means connected between said first means and said second means and connected to said force peak determining means for providing under the control of said force peak determining means a first gain to said analog signal during the compression process portion of each tablet formation and a different gain to said analog signal during the ejection process portion of each tablet formation.

13. Apparatus for deriving from a tablet press providing a tablet forming process that includes a compression process portion and an ejection process portion, both ejection force and compression force information and distinguishing between the two for any tablet formation, comprising single transducer means mounted on the press for deriving an analog signal representative of the tabletting forces generated in the tablet press for each said tablet formation, means connected to said transducer means for uniquely discriminating the compression force from the relatively very small ejection force for each said tablet formation, means connected to said discriminating means for converting to respective digital representations the peak compression force and peak ejection force for each said tablet formation in desired units, and means for recording said digital representations of peak compression force and peak ejection force.

* * * * *